United States Patent [19]

Umio

[11] 3,755,327
[45] Aug. 28, 1973

[54] 1(HOMO)PIPERAZINYL CARBONYL ALKYL 2(3H) BENZIMIDOZALINONES AND 2(3H) BENZOTHIOZOLINONE

[75] Inventor: Suminori Umio, Kawanishi, Japan

[73] Assignee: Fujisawa Pharmaceutical Co., Ltd., Osaka-shi, Japan

[22] Filed: Sept. 4, 1970

[21] Appl. No.: 69,983

Related U.S. Application Data

[63] Continuation-in-part of Ser. No. 812,448, April 1, 1969, Pat. No. 3,661,921, which is a continuation-in-part of Ser. No. 733,828, June 3, 1968, abandoned.

[30] Foreign Application Priority Data
June 5, 1967 Japan.................. 42/36113
Sept. 30, 1967 Japan.................. 42/62872

[52] U.S. Cl.................. 260/268 C, 260/239 BC
[51] Int. Cl............................... C07d 51/70
[58] Field of Search............ 260/268 C, 268 BC, 260/239 BC, 304, 309.2

[56] References Cited
UNITED STATES PATENTS

| | | | |
|---|---|---|---|
| 2,857,394 | 10/1958 | de Stevens.................... | 260/268 BC |
| 3,293,760 | 11/1966 | Sunagawa et al............. | 260/268 BC |
| 3,374,234 | 3/1968 | Arya............................. | 260/268 BC |
| 3,513,166 | 5/1970 | Richman....................... | 260/268 BC |
| 3,590,047 | 6/1971 | Shen............................. | 260/268 BC |
| 3,681,330 | 8/1972 | Pesson.......................... | 260/268 C |
| 3,069,429 | 12/1962 | Gudson et al................. | 260/304 |

FOREIGN PATENTS OR APPLICATIONS
42/1669    Japan

Primary Examiner—Donald G. Daus
Attorney—Jacobs and Jacobs

[57] ABSTRACT

N-substituted and N,N-disubstituted aminocarbonylalkyl compounds of the formula:

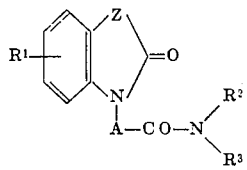

wherein
Z is sulfur or lower alkylimino;
A is lower alkylene;
$R^1$ is hydrogen, halogen, lower alkyl, lower alkoxy or trifluoromethyl; and the group of the formula:

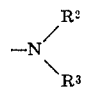

is 1-aziridinyl a 6-membered heterocyclic group selected from 2,3 or 4-hydroxypiperidino, morpholino, and a piperazine group of the formula:

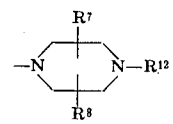

in which $R^7$ and $R^8$ are each hydrogen or lower alkyl and $R^{12}$ is hydrogen, lower alkyl, hydroxy(lower)alkyl, lower alkanoyl(lower)alkyl, lower alkanoyloxy(lower)alkyl, higher alkanoyloxy(lower)alkyl, linoloyloxy(lower)alkyl, lower alkoxycarbonyl(lower)alkyl, phenyl(lower)alkanoyloxy(lower)alkyl, 2,3,4,5 or 6-tri(lower)alkoxybenzoyloxy(lower)alkyl, phenyl(lower)alkyl, 2,3,4,5 or 6-di(lower)alkoxyphenyl(lower)alkyl, lower alkenyl, lower alkynyl, phenyl or benzoyl; or a 4-lower alkyl-1-homopiperazinyl; provided that $R^1$ is not hydrogen when the group of the formula:

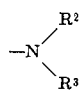

represents a 1-aziridinyl or morpholino.

These compounds exhibit pharmacological activity such as antiinflamatory activity or antiarrhythmic activity.

48 Claims, No Drawings

1(HOMO)PIPERAZINYL CARBONYL ALKYL 2(3H) BENZIMIDOZALINONES AND 2(3H) BENZOTHIOZOLINONE

CROSS - REFERENCE

This application is a continuation-in-part application of my copending application Ser. No. 812,448, filed Apr. 1, 1969, now U.S. Pat. No. 3,661,921 which is a continuation-in-part application of Ser. No. 733,828, filed June 3, 1968, now abandoned.

DETAILED DESCRIPTION

The present invention relates to N, N-disubstituted aminocarbonylalkyl compounds having pharmacological activity such as antiinflammatory activity and antiarrhythmic activity, and to their production.

The said N-substituted and N, N-disubstituted aminocarbonylalkyl compounds are represented by the formula:

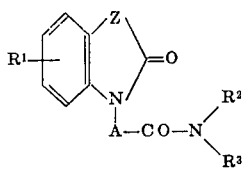

wherein
Z is sulfur or lower alkylimino;
A is lower alkylene;
$R^1$ is hydrogen, halogen, lower alkyl, lower alkoxy or trifluoromethyl; and
the group of the formula:

represents 1-aziridinyl, 6-membered heterocyclic group selected from 2,3 or 4-hydroxypiperidino, morpholino and the group of the formula:

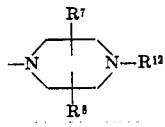

in which $R^7$ and $R^8$ are each hydrogen or lower alkyl and $R^{12}$ is hydrogen, lower alkyl, hydroxy(lower)alkyl, lower alkanoyl(lower)alkyl, lower alkanoyloxy(lower)alkyl, higher alkanoyloxy(lower)alkyl, linoloyloxy(lower)alkyl, lower alkoxycarbonyl(lower)alkyl, phenyl(lower)alkanoyloxy(lower)alkyl,2,3,4,5 or 6-tri(lower)alkoxybenzoyloxy(lower)alkyl, phenyl(lower)alkyl, 2,3,4,5 or 6-di(lower)alkoxyphenyl(lower)alkyl, lower alkenyl, lower alkynyl, phenyl or benzoyl, or 4-lower alkyl-1-homopiperazinyl; provided that $R^1$ is not hydrogen when or the group of the formula:

represents a 1-aziridinyl or morpholino.

In the above and subsequent descriptions of this invention, specific examples of each substituent are as follows:

Lower alkyl and Lower alkyl moieties in lower alkylimino, halo(lower)alkyl, hydroxy(lower)alkyl, lower alkanoyloxy(lower)alkyl, lower alkoxy(lower)alkyl, hydroxy(lower)alkoxy(lower)alkyl, hydroxycarbonyl(lower)alkyl, lower alkoxycarbonyl(lower)alkyl, lower alkanoyl(lower)alkyl, higher alkanoyloxy(lower)alkyl, linoloyloxy(lower)alkyl, phenyl(lower)alkanoyloxy(lower)alkyl, 2,3,4,5 or 6-tri (lower)alkoxybenzoyloxy(lower)alkyl, phenyl(lower)alkyl, 2,3,4,5 or 6-di(lower)alkoxyphenyl(lower)alkyl and 4-lower alkyl-1-homopiperazinyl: one having 1-6 carbon atoms ( e.g. methyl, ethyl, propyl, isopropyl, butyl, isobutyl, pentyl, hexyl, cyclohexyl, etc.)

Lower alkylene :
  one having one to six carbon atoms ( e.g. methylene, ethylene, propylene, 2-methylpropylene, butylene, pentylene, hexylene, etc.)

Lower alkoxy and Lower alkoxy moieties in lower alkoxy(lower)alkyl, hydroxy(lower)alkoxy(lower)alkyl, lower alkoxycarbonyl(lower)alkyl, 2,3,4,5 or 6-tri(lower)alkoxybenzoyloxy(lower)alkyl and 2,3,4,5 or 6-di(lower)alkoxyphenyl(lower)alkyl:
  one having one to six carbon atoms ( e.g. methoxy, ethoxy, propoxy, isopropoxy, butoxy, isobutoxy, pentoxy, hexoxy, etc.)

Lower alkanoyl and Lower alkanoyl moieties in lower alkanoyloxy(lower)alkyl, lower alkanoyl(lower)alkyl and phenyl(lower)alkanoyloxy(lower)alkyl: one having two to seven carbon atoms ( e.g. acetyl, propionyl, butyryl, isobutyryl, valery, hexanoyl, etc.)

Higher alkanoyl and Higher alkanoyl moiety in higher alkanoyloxy(lower)alkyl:
  one having eight to 20 carbon atoms ( e.g. octanoyl, isooctanoyl, caproyl, undecanoyl, lauroyl, tridecanoyl, pentadecanoyl, palmitoyl, heptadecanoyl , octadecanoyl, nonadecanoyl, etc.)

Lower alkenyl:
  one having two to six carbon atoms ( e.g. vinyl, propenyl, butenyl, isobutenyl, pentynl, hexenyl, etc.)

Lower alkynyl:
  one having two to six carbon atoms ( e.g. ethynyl, propynyl , butynyl, pentynyl, isopentynyl, hexynyl, etc.)

Halogen and Halogen moiety in halo(lower)alkyl:
  fluorine, chlorine, bromine and iodine.

The compounds of Formula I particularly and specifically include:
1-[1-piperazinylcarbonyl(lower)alkyl]-3-lower alkyl-4, 5, 6 or 7-halo-2(3H)benzimidazolinone,
3-[4-linoloyloxy(lower)alkyl]-1-piperazinylcarbonyl(lower)alkyl]-4, 5, 6 or 7-halo-2(3H)-benzothiazolinone,
3-[4-linoloyloxy(lower)alkyl]-1-piperzinylcarbonyl(lower)alkyl]-4, 5, 6 or 7-tirfluoromethyl-2(3H)-bnezothiazolinone,
1-[4-linoloyloxy(lower)alkyl]-1-piperazinylcarbonyl(lower)alkyl]-3-lower alkyl-4, 5, 6 or 7-halo-2(3H)-benzimidazolinone, N-morpholino(lower)alkyl-2-oxo-3-benzothiazoline-(lower)alkanoic amide, N-morpholino(lower)alkyl-4, 5, 6 or 7-halo-2-oxo-3-benzothiazoline(lower)alkanoic amide, 3-[1-aziridinylcarbonyl(lower)alkyl]-2(3H)-benzothiazolinone, 3-[1-aziridinylcarbonyl(lower)alkyl]-4, 5, 6 or 7-halo-2(3H)-benzothiazolinone, 3-[1-aziridinylcarbonyl(lower)alkyl]-4, 5, 6 or 7-lower alkyl-2(3H)-benzothiazolinone, 3-[2, 3 or 4-hydroxypiperidinocarbonyl(lower)alkyl]-2(3H)-benzothiazolinone, 3-[2, 3 or 4-hydroxypiperidinocarbonyl(lower)alkyl]-4, 5, 6 or 7-halo-2(3H)-benzothiazolinone, 3-[2, 3 or 4-hydroxypiperidinocarbonyl(lower)alkyl]-4, 5, 6 or 7-trifluoromethyl-2(3H)-benzothiazolinone, 3-morpholinocarbonyl(lower)alkyl-2(3H)-benzothiazolinone, 3-morpholinocarbonyl(lower)alkyl-4, 5, 6 or 7-halo-2(3H)-benzothiazolinone, 3-[1-piperazinylcarbonyl(lower)alkyl]-2(3H)-benzothiazolinone, 3-[1-piperazinylcarbonyl(lower)alkyl]-4, 5, 6 or 7-halo-2(3H)-benzothiazolinone, 3-[1-piperazinylcarbonyl(lower)alkyl]-4, 5, 6 or 7-lower alkoxy-2(3H)-benzothiazolinone, 3-[1-piperazinylcarbonyl(lower)alkyl]-4, 5, 6 or 7-trifluoromethyl-2(3H)-benzothiazolinone, 3-[4-lower alkyl-1-piperazinylcarbonyl(lower)alkyl]-2(3H)-benzothiazolinone, 3-[4-lower alkyl-1-piperazinylcarbonyl(lower)alkyl]-4, 5, 6 or 7-halo-2(3H)-benzothiazolinone, 3-[4-lower alkyl-1-piperazinylcarbonyl(lower)alkyl]-4, 5, 6 or 7-lower alkoxy-2(3H)-benzothiazolinone, 3-[4-lower alkyl-1-piperazinylcarbonyl(lower)alkyl]-4, 5, 6 or 7-trifluoromethyl-2(3H)-benzothiazolinone, 1-[4-lower alkyl-1-piperazinylcarbonyl(lower)alkyl]-3-lower-alkyl-4, 5, 6 or 7-halo-2(1H)-benzimidazolinone, 3-[2, 3, 5 or 6-di(lower)alkyl-1-piperazinylcarbonyl(lower)alkyl]-2-(3H)-benzothiazolinone, 3-[2, 3, 5 or 6-di(lower)alkyl-1-piperazinylcarbonyl(lower)alkyl]-4, 5, 6 or 7-halo-2(3H)-benzothiazolinone;

3-[2, 3, 5 or 6-di(lower)alkyl-1-piperazinylcarbonyl(lower)alkyl]-4, 5, 6 or 7-trifluoromethyl-2(3H)-benzothiazolinone, 3-[2, 3, 5 or 6-di(lower)alkyl-1-piperazinylcarbonyl(lower)alkyl]-4, 5, 6 or 7-lower alkoxy-2(3H)-benzothiazolinone, 1-[2, 3, 5 or 6-di(lower)alkyl-1-piperazinylcarbonyl(lower)alkyl]-3-lower alkyl-4, 5, 6 or 7-halo-2(3H)-benzimidazolinone, 3-[2, 3, 5 or 6-di(lower)alkyl-4-lower alkyl-1-piperazinylcarbonyl(lower)alkyl]-2(3H)-benzothiazolinone, 3-[2, 3, 5 or 6-di(lower)alkyl-4-lower alkyl-1-piperazinylcarbonyl(lower)alkyl]-4, 5, 6 or 7-halo-2(3H)-benzothiazolinone, 3-[2, 3, 5 or 6-di(lower)alkyl-4-lower alkyl-1-piperazinylcarbonyl(lower)alkyl]-4, 5, 6 or 7-lower alkoxy-2(3H)-benzothiazolinone, 3-[2, 3, 5 or 6-di(lower)alkyl-4-lower alkyl-1-piperazinylcarbonyl(lower)alkyl]-4, 5, 6 or 7-trifluoromethyl-2(3H)-benzothiazolinone, 1-[2, 3, 5 or 6-di(lower)alkyl-4-lower alkyl-1-piperazinylcarbonyl(lower)alkyl]-3-lower alkyl-4, 5, 6 or 7-halo-2(3H)-benzimidazolinone, 3-[4-hydroxy(lower)alkyl-1-piperazinylcarbonyl(lower)alkyl]-2(3H)-benzothiazolinone, 3-[4-hydroxy(lower)alkyl-1-piperazinylcarbonyl(lower)alkyl]-4, 5, 6 or 7-halo-2(3H)-benzothiazolinone, 3-[4-hydroxy(lower)alkyl-1-piperazinylcarbonyl(lower)alkyl]-4, 5, 6 or 7-lower alkoxy-2(3H)-benzothiazolinone, 3-[4-hydroxy(lower)alkyl-1-piperazinylcarbonyl(lower)alkyl]-4, 5, 6 or 7-trifluoromethyl-2(3H)-benzothiazolinone, 1-[4-hydroxy(lower)alkyl-1-piperazinylcarbonyl(lower)alkyl]-3-lower alkyl-2(3H)-benzimidazolinone, 1-[4-hydroxy(lower)alkyl-1-piperazinylcarbonyl(lower)alkyl]-3-lower alkyl-4, 5, 6 or 7-halo-2(3H)-benzimidazolinone, 1-[4-hydroxy(lower)alkyl-1-piperazinylcarbonyl(lower)alkyl]-3-lower alkyl-4, 5, 6 or 7-trifluoromethyl-2(3H)-benzimidazolinone, 3-[2, 3, 5 or 6-di(lower)alkyl-4-hydroxy(lower)alkyl-1-piperazinylcarbonyl(lower)alkyl]-4, 5, 6 or 7-halo-2(3H)-benzothiazolinone, 3-[2, 3, 5 or 6-di(lower)alkyl-4-hydroxy(lower)alkyl-1-piperazinylcarbonyl(lower)alkyl]-4, 5, 6 or 7-trifluoromethyl-2(3H)-benzothiazolinone, 3-[4-lower alkanoyl(lower)alkyl-1-piperazinylcarbonyl(lower)alkyl]-2(3H)-benzothiazolinone, 3-[4-lower alkanoyl(lower)alkyl-1-piperazinylcarbonyl(lower)alkyl]-4, 5, 6 or 7-halo-2(3H)-benzothiazolinone, 3-[4-lower alkanoyl(lower)alkyl-1-piperazinylcarbonyl(lower)alkyl]-4, 5, 6 or 7-trifluoromethyl-2(3H)-benzothiazolinone, 1-[4-lower alkanoyl(lower)alkyl-1-piperazinylcarbonyl(lower)alkyl]-4, 5, 6 or 7-halo-2(3H)-benzimidazolinone, 3-[2, 3, 5 or 6-di(lower)alkyl-4-lower alkanoyl(lower)alkyl-1-piperazinylcarbonyl(lower)alkyl]-4, 5, 6 or 7-halo-2(3H)-benzothiazolinone, 3-[4-lower alkenyl-1-piperazinylcarbonyl(lower)alkyl]-4, 5, 6 or 7-halo-2(3H)-benzothiazolinone, 3-[4-lower alkenyl-1-piperazinylcarbonyl(lower)alkyl]-4, 5, 6 or 7-trifluoromethyl-2(3H)-benzothiazolinone, 3-[2, 3, 5 or 6-di(lower)alkyl-4-lower alkenyl-1-piperazinylcarbonyl(lower)alkyl]-2(3H)-benzothiazolinone, 3-[2, 3, 5 or 6-di(lower)alkyl-4-lower alkenyl-1-piperazinylcarbonyl(lower)alkyl]-4, 5, 6 or 7-halo-2(3H)-benzothiazolinone, 3-[2, 3, 5 or 6-di(lower)alkyl-4-lower alkenyl-1-piperazinylcarbonyl(lower)alkyl]-4, 5, 6 or 7-trifluoromethyl-2(3H)-benzothiazolinone, 1-[2, 3, 5 or 6-di(lower)alkyl-4-lower alkenyl-1-piperazinylcarbonyl(lower)alkyl]-3-lower alkyl-4, 5, 6 or 7-halo-2(3H)-benzimidazolinone, 3-[4-lower alkynyl-1-piperazinylcarbonyl(lower)alkyl]-4, 5, 6 or 7-halo-2(3H)-benzothiazolinone, 1-[4-lower alkynyl-1-piperazinylcarbonyl(lower)alkyl]-3-lower alkyl-2(3H)-benzimidazolinone, 3-[2, 3, 5 or 6-di(lower)alkyl-4-lower alkynyl-1-piperazinylcarbonyl(lower)alkyl]-4, 5, 6 or 7-halo-2(3H)-benzothiazolinone, 3-[2, 3, 5 or 6-di(lower)alkyl-4-lower alkynyl-1-piperazinylcarbonyl(lower)alkyl]-4, 5, 6 or 7-trifluoromethyl-2(3H)-benzothiazolinone, 3-[2, 3, 5 or 6-di(lower)alkyl-4-lower alkynyl-1-piperazinylcarbonyl(lower)alkyl]-4, 5, 6 or 7-lower alkoxy-2(3H)-benzothiazolinone, 3-[4-lower alkoxycarbonyl(lower)alkyl-1-piperazinylcarbonyl(lower)alkyl]-4, 5, 6 or 7-halo-2(3H)-benzothiazolinone, 3-[2, 3, 5 or 6-di(lower)alkyl-4-lower alkoxycarbonyl(lower)alkyl-1-piperazinylcarbonyl(lower)alkyl]-2(3H)-benzothiazolinone, 3-[2, 3, 5 or 6-di(lower)alkyl-4-lower alkoxycarbonyl(lower)alkyl-1-piperazinylcarbonyl(lower)alkyl]-4, 5, 6 or 7-halo-2(3H)-benzothiazolinone, 3-[2, 3, 5 or 6-di(lower)alkyl-4-lower alkoxycarbonyl(lower)alkyl-1-piperazinylcarbonyl(lower)alkyl]-4, 5, 6 or 7-trifluoromethyl-2(3H)-benzothiazolinone, 3-[4-lower alkanoyloxy(lower)alkyl-1-piperazinylcarbonyl(lower)alkyl]-2(3H)-benzothiazolinone, 3-[4-lower alkanoyloxy(lower)alkyl-1-piperazinylcarbonyl(lower)alkyl]-4, 5, 6 or 7-halo-2(3H)-benzothiazolinone, 3-[4-lower alkanoyloxy(lower)alkyl-1-piperazinylcarbonyl(lower)alkyl]-4, 5, 6 or 7-trifluoromethyl-2(3H)-benzothiazolinone, 3-[4-lower alkanoyloxy(lower)alkyl-1-piperazinylcarbonyl(lower)alkyl]-4, 5, 6 or 7-lower alkoxy-2(3H)-benzothiazolinone, 1-[4-lower alkanoyloxy(lower)alkyl-1-piperazinylcarbonyl(lower)alkyl]-3-lower alkyl-4, 5, 6 or 7-halo-2(3H)-benzimidazolinone, 1-[4-lower alkanoyloxy(lower)alkyl-1-piperazinylcarbonyl(lower)alkyl]-3-lower alkyl-4, 5, 6 or 7-trifluoromethyl-2(3H)-benzimidazolinone, 3-[2, 3, 5 or 6-di(lower)alkyl-4-lower alkanoyloxy(lower)alkyl-1-piperazinylcarbonyl(lower)alkyl]-4, 5, 6 or 7-hal-2(3H)-benzothiazolinone, 3-[4-higher alkanoyloxy(lower)alkyl-1-piperazinylcarbonyl(lower)alkyl]-2(3H)-benzothiazolinone, 3-[4-higher alkanoyloxy(lower)alkyl-1-piperazinylcarbonyl(lower)alkyl]-4, 5, 6, or 7-halo-2(3H)-benzothiazolinone, 3-[4-higher alkanoyloxy(lower)alkyl-1-piperazinylcarbonyl(lower)alkyl]-4, 5, 6 or 7-trifluoromethyl-2(3H)-benzothiazolinone, 3-[4-higher alkanoyloxy(lower)alkyl-1-piperazinylcarbonyl(lower)alkyl]-4, 5, 6 or 7-lower alkoxy-2(3H)-benzothiazolinone, 1-[4-higher alkanoyloxy(lower)alkyl-1-piperazinylcarbonyl(lower)alkyl]-3-lower alkyl-4, 5, 6 or 7-halo-2(3H)-benzimidazolinone, 1-[4-higher alkanoyloxy(lower)alkyl-1-piperazinylcarbonyl(lower)alkyl]-3-lower alkyl-4, 5, 6 or 7-trifluoromethyl-2(3H)-benzimidazolinone, 3-[2, 3, 5 or 6-di(lower)alkyl-4-higher alkanoyloxy(lower)alkyl-1-piperazinylcarbonyl(lower)alkyl]-2(3H)-benzathiazolinone, 3-[2, 3, 5 or 6-di(lower)alkyl-4-higher alkanoyloxy (lower)alkyl-1-piperazinylcarbonyl(lower)alkyl]-4, 5, 6 or 7-halo-2(3H)-benzothiazolinone, 3-[2, 3, 5 or 6-di(lower)alkyl-4-higher alkanoyloxy (lower)alkyl-1-piperazinylcarbonyl(lower)alkyl]-4, 5, 6 or 7-trifluoromethyl-2(3H)-benzothiazolinone, 3-[4-phenyl-1-piperazinylcarbonyl(lower)alkyl]-2(3H)-benzothiazolinone, 3-[4-phenyl-1-piperazinylcarbonyl(lower)alkyl]-4, 5, 6 or 7-halo-2(3H)-benzothiazolinone, 3-[4-phenyl-1-piperazinylcarbonyl(lower)alkyl]-4, 5, 6 or 7-trifluoromethyl-2(3H)-benzothiazolinone, 1-[4-phenyl-1-piperazinylcarbonyl(lower)alkyl]-4, 5, 6 or 7-halo-2(3)-benzimidazolinone 3-[4-phenyl(lower)alkyl-1-piperazinylcarbonyl(lower) alkyl]-2(3H)-benzothiazolinone, 3-[4-phenyl(lower)alkyl-1-piperazinylcarbonyl(lower) alkyl]-4, 5, 6 or 7-halo-2(3H)-benzothiazolinone, 3-[4-phenyl(lower)alkyl-1-piperazinylcarbonyl(lower) alkyl]-4, 5, 6 or 7-trifluoromethyl-2(3H)-benzothiazolinone, 3-[4-phenyl(lower)alkyl-1-piperazinylcarbonyl(lower) alkyl]-4, 5, 6 or 7-trifluoroemthyl-2(3H)-benzothiazolinone, 3-[4-[2, 3, 4, 5 or 6-di(lower)alkoxyphenyl(lower) alkyl]-1-piperazinylcarbonyl(lower)alkyl]-4, 5, 6 or 7-halo-2(3H)-benzothiazolinone, 3-[4-[2, 3, 4, 5 or 6-di(lower)alkoxyphenyl(lower) alkyl]-1-piperazinylcarbonyl(lower)alkyl]-4, 5, 6 or 7-trifluoromethyl-2(3H)-benzothiazolinone, 3-[4-benzoyl-1-piperazinylcarbonyl(lower)alkyl]-2(3H)-benzothiazolinone, 3-[4-benzoyl-1-piperazinylcarbonyl(lower)alkyl]- 4, 5, 6 or 7-halo-2(3H)-benzothiazolinone, 3-[4-benzoyl-1-piperazinylcarbonyl(lower)alkyl]- 4, 5, 6 or 7-trifluoromethyl-2(3H)-benzothiazolinone, 3-[4-phenyl(lower)alkanoyloxy(lower)alkyl-1- piperazinylcarbonyl(lower)alkyl]-4, 5, 6 or 7-halo-2(3H)-benzothiazolinone, 3-[4-phenyl(lower)alkanoyloxy(lower)alkyl-1- piperazinylcarbonyl(lower)alkyl]-4, 5, 6 or 7- trifluoromethyl-2(3H)-benzothiazolinone, 3-[4-[2, 3, 4, 5 or 6-tri(lower)alkoxybenzoyloxy (lower)alkyl]-1-piperazinylcarbonyl(lower)alkyl]- 4, 5, 6 or 7-halo-2(3H)-benzothiazolinone, 3-[4-[2, 3, 4, 5 or 6-tri(lower)alkoxybenzoyloxy (lower)alkyl]-1-piperazinylcarbonyl(lower)alkyl]- 4, 5, 6 or 7-trifluoromethyl-2(3H)-benzothiazolinone, 3-[4-lower alkyl-1-homopiperazinylcarbonyl(lower) alkyl]-2(3H)-benzothiazolinone, 3-[4-lower alkyl-1-homopiperazinylcarbonyl(lower) alkyl]-4, 5, 6 or 7-halo-2(3H)-benzothiazolinone, 3-[4-lower alkyl-1-homopiperazinylcarbonyl(lower) alkyl]-4, 5, 6 or 7-trifluoromethyl-2(3H)-benzothiazolinone.

It has now been found that the compounds of Formula I commonly and characteristically show antiinflammatory and/or antiarrhythmic activity. Among them, the following compound exhibits relatively high antiinflammatory potency: 3-[4-(2-hydroxyethyl)- 1-piperazinylcarbonylmethyl]-5-chloro-2(3H)-benzothiazolinone. Further, the following compounds exhibit relatively strong antiarrhythmic potency: N-[2-(N,N-diethylamino)ethyl]-2-oxo-3-benzothiazolineacetamide, N-[2-(N,N-diethylamino)ethyl]-5-chloro-2-oxo-3-benzothiazolineacetamide, N-[3-(N,N-dimethylamino)propyl]-2-oxo-3-benzothiazoline acetamide, N-[2-(N,N-diethylamino)ethyl]-6-ethoxy-2-oxo-3-benzothiazolineacetamide, etc.

Accordingly, a basic object of the present invention is to provide N,N-disubstituted amino carbonylalkyl compounds of Formula I. Another object of this invention useful as antiinflammatory agents and antiarrhythmic agents. A further object of the invention is to provide a process for preparing the compounds of the Formula I. These and other objects will be apparent to those conversant with the art to which the present invention pertains from the subsequent description.

According to the present invention, the compounds of Formula I can be prepared from the corresponding nitrogen containing heterocyclic compound of the formula:

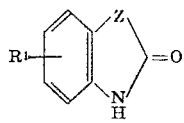

[II]

wherein Z and $R^1$ are each as defined above or the corresponding carboxylalkyl compound of the formula:

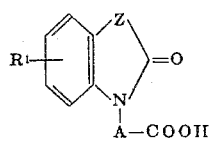

[III]

wherein Z, A and $R^1$ are each as defined above.

When the starting compound is the compound of Formula II, it is subjected to N,N-disubstituted amino carbonylalkylation. The N,N-disubstituted aminocarbonylalkylation may be carried out by reacting the compound of Formula II [J.Pharm.Soc.Japan, 77, 347 (1957)] or its reactive derivative with an alkyl halide of the formula:

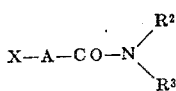

wherein X is halogen (e.g. chlorine, bromine, etc.) and A, $R^2$ and $R^3$ are each as defined above. Examples of the reactive derivative of the compound of Formula II are metal salts (e.g. sodium salt, potassium salt, calcium salt, etc.). The reaction is usually effected in an inert solvent (e.g. benzene, toluene, ether, methanol, ethanol, dimethylformamide, etc.). In the case using the compound of Formula II as such, it is desirable to use a condensing agent, of which examples are alkali hydroxide (e.g. sodium hydroxide, potassium hydroxide, etc.), alkali carbonate (e.g. sodium carbonate, potassium carbonate, etc.), alkali alkoxide (e.g. sodium methoxide, sodium ethoxide, potassium ethoxide, etc.), alkali hydride (e.g. sodium hydride, potassium hydride, etc.), alkali amide (e.g. sodium amide, potassium amide, lithium amide, etc.) and the like.

When the starting compound is the compound of Formula III, it is subjected to N,N-disubstituted amination. The N,N-disubstituted amination may be carried out by reacting the compound of Formula III ]British patent 862,226], its salt or its reactive derivative with an amine of the formula:

wherein $R^2$ and $R^3$ are each as defined above. Examples of the salt of the compound of Formula III are metal salts (e.g. sodium salt, potassium salt, calcium salt, etc.), ammonium salt, salts with organic base (e.g. triethylamine salt, etc.) and the like. Example of the reactive derivative of the compound of Formula III are acid halides (e.g. acid chloride, acid bromide, etc.), acid anhydrides (e.g. alkylphosphoric acid anhydride, dibenzylphosphoric acid anhydride, halophosphoric acid anhydride, dialkylphosphoric acid anhydride, sulfurous acid anhydride, thiosulfuric acid anhydride, sulfuric acid anhydride, alkylcarbonic acid anhydride, aliphatic carboxylic acid anhydride, aromatic carboxylic acid anhydride, symmetric acid anhydride, etc.), acid amides (e.g. acid amide with imidazole, acid amide with 4-substituted imidazole, etc.), acid esters (e.g. methyl ester, ethyl ester, cyanomethyl ester, p-nitrophenyl ester, pentachlorophenyl ester, 2,4,5-trichlorophenyl ester, propargyl ester, carboxymethyl thioester, pyranyl ester, methoxymethyl ester, phenyl thioester, etc.) and acid azide. In the case using the compound of Formula III as such, it is usually required to employ a condensing agent. Examples of the condensing agent are N,N'-dicyclohexylcarbodiimide, N-cyclohexyl-N'-morpholinoethylcarbodiimide, N-cyclohexyl-N'-(4-diethylaminocyclohexyl)carbodiimide, N,N'-diethylcarbodiimide, N,N'- diisopropylcarbodiimide, N-ethyl-N'-(3-dimethylaminopropyl)- carbodiimide, N,N'-carbonyldi(2-methylimidadole), pentamethyleneketene-N-cyclohexylimine, diphenylketene-N-cyclohexylimine, alkoxyacetylene, 1-alkoxy-1-chloroethylene, tetraalkyl phosphite, N-ethyl-0-phenylisoxazolium-3'-sulfonate, ethyl polyphosphate, isopropyl polyphosphate, phosphorus oxychloride, phosphorus trichloride, thionyl chloride, oxalyl chloride, triphenyl phosphine, etc. The reaction is usually executed in an inert solvent (e.g. acetone, dioxane, acetonitrile, chloroform, ethylene dichloride, tetrahydrofuran, ethyl acetate, pyridine, etc.). If necessary, a basic substance (e.g. alkali carbonate, alkali hydrogen carbonate, trialkylamine, pyridine, etc.) may be present in the reaction.

Some of the compounds of Formula I may be alternatively produced from the products of either one of the fundamental procedures (i.e. or N,N-disubstituted aminocarbonylalkylation and or N,N-disubstituted amination). An example of such alternative procedures is shown in the following scheme:

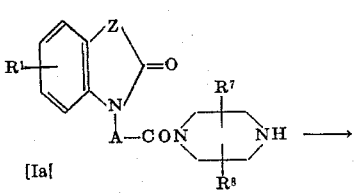

[Ia]

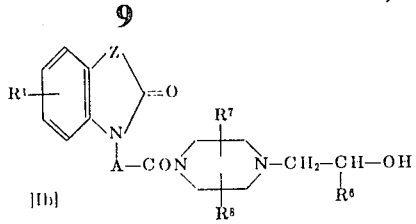

wherein R⁶ is hydrogen or lower alkyl (e.g., methyl, ethyl, propyl, etc.), R⁷ and R⁸ are each hydrogen or lower alkyl (e.g. methyl, ethyl, propyl, etc.) and Z, A and R¹ are each as defined above.

In the above scheme, the starting compound [1a] is obtained by the reaction of a compound of Formula III with an amine of the formula:

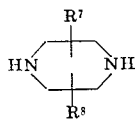

wherein R⁷ and R⁸ are each as defined above, which is an embodiment of N,N-disubstituted amination. The conversion of the compound of Formula [1a] into the compound of Formula [1b] may be effected by reacting the former with an alkylene oxide of the formula:

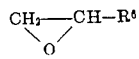

wherein R⁶ is as defined above. The reaction can be effected in an inert solvent (e.g. methanol, ethanol, acetone, chloroform, dioxane, benzene, n-hexane, toluene, xylene, etc.). In place of the inert solvent, the alkylene oxide (e.g. ethylene oxide, propylene oxide, etc.) itself may be served as the reaction medium.

Another example of the alternative procedures is shown in the following scheme:

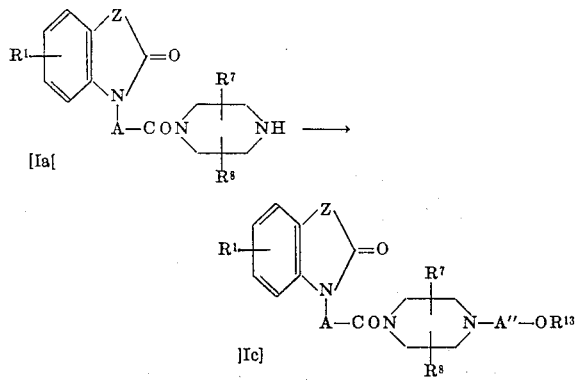

wherein A" is lower alkylene (e.g. methylene, ethylene, methylmethylene, trimethylene, propylene, etc.), R¹³ is hydrogen, lower alkanoyl (e.g. acetyl, propionyl, butyryl), higher alkanoyl (e.g. lauroyl, palmitoyl, stearoyl), phenyl(lower)alkanoyl (e.g. phenylacetyl, phenylpropionyl), 2,3,4,5 or 6-tri(lower)alkoxybenzoyl (e.g. 3,4,5-trimethoxybenzoyl, 2,3,4-triethoxybenzoyl) or linoloyl and Z, A, R¹, R⁷ and R⁸ are each as defined above. The above conversion of the compound [of Formula Ia] into the compound [of Formula Ic] may be carried out by reacting the former with a halo-alkanol derivative of the formula: X'''—A"—OR¹³ wherein X''' is halogen (e.g. chlorine, bromine, iodine, etc.) and A" and R¹³ are as defined above. The reaction can be effected in an inert solvent (e.g. methanol, ethanol, ether, benzene, acetone, dimethylformamide, dimethylsulfoxide, etc.), if needed, in the presence of a condensing agent such as alkali metal carbonate (e.g. sodium carbonate, potassium carbonate, etc.), alkaline earth metal carbonate (e.g. magnesium carbonate, calcium carbonate, etc.) or alkali metal hydrogen carbonate (e.g. sodium hydrogen carbonate, potassium hydrogen carbonate, etc.). Instead of the inert solvent, the haloalkanol derivative ( e.g. 2-bromoethanol, 2-chloroethanol, 2-iodoethanol, 3-bromopropanol, 1-bromo-2-propanol, 2-chloroethyl acetate, 2-bromopropyl acetate, 2-chloroethyl palmitate, 3-chloropropyl palmitate, 2-bromoethyl phenylacetate, 2-chloroethyl 3,4,5-trimethoxybenzoate, etc.) may be employed itself as the reaction medium.

Another example of the alternative procedures is shown in the following scheme:

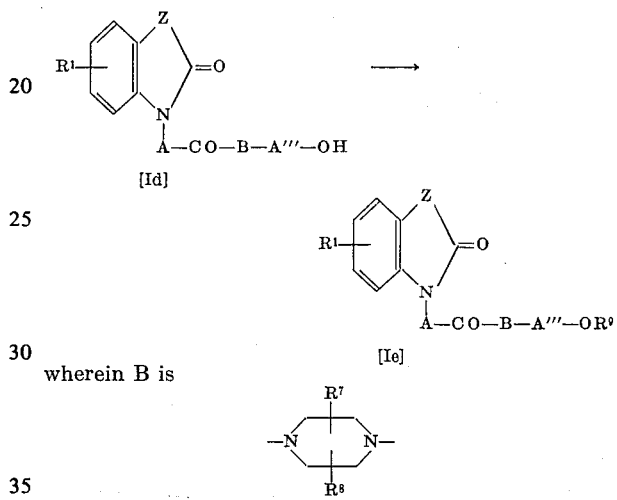

wherein B is

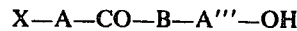

in which R⁷ and R⁸ are each as defined above, A''' is lower alklene (e.g. methylene, ethylene, methylmethylene, trimethylene, propylene), R⁹ is lower alkanoyl (e.g. acetyl, propionyl, butyryl, higher alkanoyl (e.g. lauroyl, palmitoyl, stearoyl, etc.), phenyl(lower)alkanoyl (e.g. phenylacetyl, phenylpropionyl, etc.), 2,3,4,5 or 6-tri(lower)alkoxybenzoyl (e.g. 3, 4, 5-trimethoxybenzoyl, 2, 3,4-triethoxybenzoyl, etc.) or linoloyl and Z, A and R¹ are each as defined above.

In the above scheme, the starting compound of Formula Id is obtained by the reaction of the compound of Formula II with an alkyl halide of the formula:

X—A—CO—B—A'''—OH wherein X, B, A and A'''are each as defined above, which is an embodiment of N,N-disubstituted aminocarbonylalkylation, or of the compound of Formula III with an amine of the formula:

H—B—A'''—OH wherein B and A''' are each as defined above which is an embodiment of N,N-disubstituted amination. The compounds Formulas Ib or Ic may be also used as the starting compound in this procedure. The conversion of the compound [Id] into the compound [Ic] may be effected by reacting the former with an acylating agent. Examples of the acylating agent are lower alkanoic anhydride (e.g. acetic anhydride, propionic anhydride, butyric anhydride), higher alkanoic anhydride (e.g. lauric anhydride, palmitic anhydride, stearic anhydride), phenyl(lower)alkanoic anhydride (e.g. phenylacetic anhydride, phenylpropionic anhydride), 2,3,4,5 or 6-tri(lower)alkoxybenzoic anhydride (e.g. 3,4,5-trimethoxybenzoic anhydride, 2,3,4-triethoxybenzoic anhydride) or linolic anhydride and lower alkanoyl halide (e.g. acetyl chloride, acetyl bromide, propionyl chloride, butyryl chloride), higher alkanoyl halide (e.g. lauroyl chloride, palmitoyl chloride, palmitoyl bromide, stearoyl chloride), phenyl(lower)alkanoyl halide (e.g. phenylacetyl chloride, phenylpropionyl chloride), 2,3,4,5 or 6-tri(lower)alkoxybenzoyl halide (e.g. 3,4,5-trimethoxybenzoyl chloride, 2,3,4-triethoxybenzoyl bromide) or linoloyl halide (e.g. linoloyl chloride, linoloyl bromide).

The reaction can be carried out in a per se conventional procedure adopted for acylation.

A further example of the alternative procedures is shown in the following scheme:

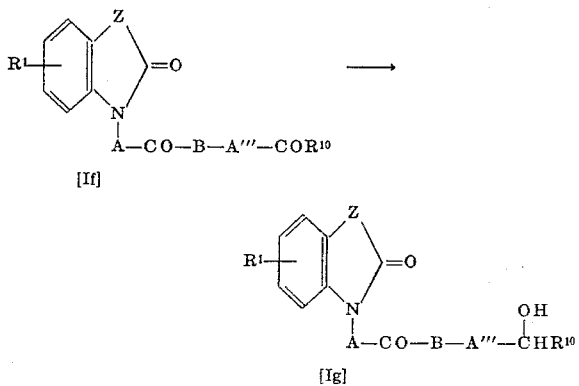

wherein $R^{10}$ is lower alkyl (e.g. methyl, ethyl, propyl, isopropyl) and Z, B, A, A''' and $R^1$ are each as defined above.

In the above scheme, the starting compound of Formula I$f$ is obtained by the reaction of a compound of Formula II with an alkyl halide of the formula: X—A—CO—B—A'''—COR$^{10}$ wherein X, B, A, A''' and $R^{10}$ are each as defined above which is an embodiment of the said N-substituted or N,N-disubstituted aminocarbonylalkylation or of the compound of Formula III with an amine of the formula:

H—B—A'''—COR$^{10}$ wherein B, A''' and $R^{10}$ are each as defined above which is an embodiment of N,N-disubstituted amination. The conversion of the compound of Formula I$f$ into the compound of Formula I$g$ may be effected by treating the former with a reducing agent, preferably alkali metal hydride complex (e.g. lithium aluminum hydride) in an inert solvent (e.g. ether, tetrahydrofuran, dioxane).

A still further example of the alternative procedures is shown in the following scheme:

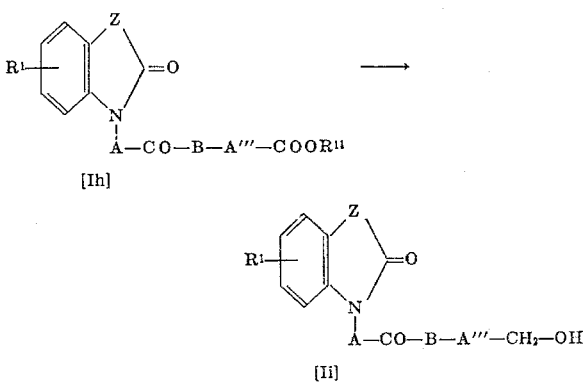

wherein $R^{11}$ is lower alkyl (e.g. methyl, ethyl, propyl, isopropyl) and Z, B, A, A''' and $R^1$ are each as defined above.

In the above scheme, the starting compound of Formula I$h$ is obtained by the reaction of a compound of Formula II with an alkyl halide of the formula:

X—A—CO—B—A'''—COOR$^{11}$ wherein X, B, A, A''' and $R^{11}$ are each as defined above which is an embodiment of N,N-disubstituted aminocarbonylalkylation or of the the compound of Formula III with an amine of the formula:

H—B—A'''—COOR$^{11}$ wherein B, A''' and $R^{11}$ are each as defined above which is an embodiment of N,N-disubstituted amination. The conversion of the compound of Formula I$h$ into the compound of Formula I$i$ may be executed by treating the former with a reducing agent, preferably alkali metal hydride complex (e.g. lithium aluminum hydride) in an inert solvent (e.g. ether, tetrahydrofuran, dioxane).

As stated above, the compounds of Formula I are useful as antiinflammatory agents. Some of test results which ensure such utility are shown below.

1. The inhibitory effect on swelling induced by formalin, albumin or carrageenin.

Method

Wistar strain male rats each weighing 150 to 200 g were divided into two groups. One group (10 rats) received orally 1 ml of a suspension of the test drug in 1 percent carboxy-methylcellulose solution per 100 g of the body weight (the drug treated group); the other group (10 rats) received 1 ml of 1 percent carboxymethylcellulose solution alone per 100 g of the body weight in the similar fashion (control group). One hour after administration, formalin (2 %, 0.1 ml), egg white albumin (10 %, 0.1 ml) or carrageenin (1 %, 0.1 ml) was given to the animals into the hind paw to induce swelling. The paw's thickness was measured by a slide calipers at varying time intervals after injection of the swelling-inducing substance. The swelling percent and the inhibitory percent of swelling were calculated from the following equations:

Swelling percent = $[(t − T)/T] × 100$ (%)

T: paw's thickness before thee swelling-inducing substance being given.

t: paw's thickness at the varying time after the swelling-inducing substance being given.

Inhibitory percent = $[(C − D)/C] × 100$ (%)

C: Swelling percent in control group.

D: Swelling percent in the drug treated group.

Several hours after injection of the swelling-inducing substance (3 hours in formalin or albumin injection; 4 hours in carrageenin injection), the animals were killed. Both hind paws were cut off and weighed. The swelling percent and the inhibitory percent of swelling were calculated from the following equations:

Swelling percent = $[(w − W)/W] × 100$ (%)

W: Weight of the swelling-inducing substance uninjected paw.

w: Weight of the swelling-inducing substance injected paw.

Inhibitory percent = $[(E − F)/E] × 100$ (%)

E: Swelling percent in cotrol group.

F: Swelling percent in the drug treated group.

Results.

The results are shown in the following Tables:

TABLE 1.—(INDUCED BY FORMALIN)

| Test drug | Dose (mg./kg.) | Inhibitory percent after | | | Cutting |
|---|---|---|---|---|---|
| | | 1 hr. | 2 hrs. | 3 hrs. | |
| 3-[4-(2-hydroxyethyl)-1-piperazinyl-carbonylmethyl]-5-chloro-2(3H)-benzothiazolinone | 500 | 27.2 | 24.0 | 19.6 | 8.6 |
| | 250 | 27.2 | 27.2 | 28.4 | 12.0 |
| | 125 | 0.1 | 4.5 | 4.5 | 4.5 |
| 3-[4-(2-hydroxypropyl)-1-piperazinyl-carbonylmethyl]-5-chloro-2(3H)-benzothiazolinone | 500 | 39.6 | 32.0 | 31.6 | 38.1 |
| | 250 | 56.9 | 49.6 | 40.4 | 38.1 |
| | 125 | 46.1 | 28.9 | 38.1 | 28.9 |
| Oxyphenylbutazone | 500 | | | | |
| | 250 | | | | 28.6 |
| | 125 | | | | 4.7 |

TABLE 2.—(INDUCED BY ALBUMIN)

| Test drug | Dose (mg./kg.) | Inhibitory percent after— | | | Cutting |
|---|---|---|---|---|---|
| | | 1 hr. | 2 hrs. | 3 hrs. | |
| 3-[4-(2-hydroxyethyl)-1-piperazinyl-carbonylmethyl]-5-chloro-2(3H)-benzothiazolinone | 500 | 48.1 | 56.2 | 59.7 | 71.8 |
| | 250 | 31.4 | 34.2 | 40.6 | 51.2 |
| | 125 | 21.0 | 22.3 | 25.8 | 39.7 |
| 3-[4-(2-Palmitoyloxyethyl)-1-piperazinyl-carbonylmethyl]-5-chloro-2(3H)-benzothiazolinone | 500 | 21.2 | 21.2 | 18.3 | 40.0 |
| | 250 | 19.6 | 17.4 | 9.5 | 31.6 |
| | 125 | 15.7 | 11.3 | 7.6 | 26.2 |
| 3-[4-(2-hydroxypropyl-1-piperazinyl-carbonylmethyl]-5-chlor-2(3H)-benzothiazolinone | 500 | 39.8 | 38.6 | 48.7 | 62.3 |
| | 250 | 34.4 | 36.8 | 42.0 | 56.0 |
| | 100 | 36.4 | 34.7 | 37.0 | 53.4 |
| 3-[4-(2-acetoxyethyl-1-piperazinyl-carbonylmethyl]-5-chloro-2(3H)-benzothiazolinone | 500 | 41.6 | 40.3 | 53.0 | 58.4 |
| | 250 | 23.8 | 26.6 | 34.7 | 46.5 |
| | 125 | 15.1 | 17.8 | 27.7 | 30.3 |
| 3-[4-(2-hydroxybutyl-1-piperazinyl-carbonylmethyl]-5-chloro-2(3H)-benzothiazolinone | 500 | 40.3 | 44.8 | 57.0 | 55.4 |
| | 250 | 34.6 | 35.8 | 36.8 | 45.2 |
| | 125 | 23.0 | 19.1 | 21.5 | 25.8 |
| 3-[4-(2-isobutanoyloxyethyl-1-piperazinyl-carbonylmethyl]-5-chloro-2(3H)-benzothiazolinone | 500 | 51.4 | 54.2 | 56.1 | 61.8 |
| | 250 | 36.3 | 37.0 | 40.5 | 48.9 |
| | 125 | 35.8 | 36.4 | 35.5 | 41.1 |
| Oxyphenylbutazone | 500 | | | | |
| | 250 | | | | |
| | 125 | | | | |

TABLE 3.—(INDUCED BY CARRAGEENIN)

| Test drugs | Dose (mg./kg.) | Inhibitory percent after— | | | | Cutting |
|---|---|---|---|---|---|---|
| | | 1 hr. | 2 hrs. | 3 hrs. | 4 hrs. | |
| 3-[4-(2-hydroxyethyl)-1-piperazinyl-carbonylmethy]-5-chloro-2(3H)-benzothiazolinone | 500 | 56.3 | 57.7 | 55.9 | 50.0 | 57.1 |
| | 250 | 43.2 | 41.9 | 42.3 | 40.9 | 37.0 |
| | 125 | 39.0 | 7.9 | 16.7 | 12.2 | 13.1 |
| 3-[4-(2-palmitoyloxyethyl)-1-piperazinyl-carbonylmethyl]-5-chloro-2(3H)-benzothiazolinone | 500 | 29.2 | 33.9 | 31.3 | 29.2 | 41.3 |
| | 250 | 22.7 | 26.9 | 24.4 | 22.4 | 27.5 |
| | 125 | 15.6 | 16.9 | 14.5 | 12.5 | 13.8 |
| 3-[4-(2-acetylmethyl)-1-piperazinyl-carbonylmethyl]-5-chloro-2(3H)-benzothiazolinone | 500 | 28.0 | 47.8 | 53.0 | 50.1 | 49.3 |
| | 250 | 16.5 | 34.8 | 37.4 | 32.8 | 43.7 |
| | 125 | 16.5 | 28.2 | 29.5 | 25.2 | 38.4 |
| 3-[4-(2-isobutanoyloxyethyl)-1-piperazinyl-carbonylmethyl]-5-chloro-2(3H)-benzothiazolinone | 500 | 22.1 | 45.2 | 38.3 | 32.8 | 43.3 |
| | 250 | 28.6 | 31.7 | 27.9 | 17.1 | 22.5 |
| | 125 | 12.6 | 35.2 | 26.4 | 15.4 | 39.5 |
| 3-[4-(2-hydroxypropyl-1piperazinyl-carbonylmethyl]-5-chloro-2(3H)-benzothiazolinone | 500 | 35.2 | 53.2 | 57.3 | 54.4 | 62.6 |
| | 250 | 47.8 | 60.0 | 59.8 | 58.9 | 54.6 |
| | 125 | 43.3 | 39.1 | 38.4 | 40.4 | 43.8 |
| 3-[4-(2-hydroxyethyl)-1-piperazinyl-carbonylmethyl]-5-trifluoromethyl-2(3H)-benzothiazolinone | 500 | 54.2 | 51.3 | 47.4 | 47.0 | 55.9 |
| | 250 | 21.9 | 49.3 | 43.2 | 37.9 | 50.3 |
| | 125 | 15.7 | 36.4 | 29.9 | 26.2 | 26.7 |
| Oxyphenylbutazone | 500 | | | | | |
| | 250 | | | | | 47.4 |
| | 125 | | | | | 16.6 |

NOTE.—In the group which received oxyphenylbutazone at a dose of 500 mg./kg., no reliable value could be obtained due to death of almost all animals.

TABLE 4

| Test drugs | Dose, (mg./kg.) | Inhibitory percent (cutting) | | |
|---|---|---|---|---|
| | | Formalin | Albumin | Carrageenin |
| [structure: Cl-benzothiazolinone with CH₂CONHCH₂CH(CH₃)OH] | 500<br>250<br>125 | 26.5<br>6.2<br>2.9 | 57.6<br>41.5<br>13.3 | -1.1<br>-4.2<br>0.4 |
| [structure: Cl-benzothiazolinone with CH₂CONHCH₂CH₂OH] | 500<br>250<br>125 | 17.2<br>12.0<br>4.5 | | |
| [structure: benzothiazolinone with CH₂CONHCH₂CH₂OCH₂CH₂OH] | 500<br>250<br>125 | | 39.5<br>17.9<br>10.3 | |
| [structure: Cl-benzothiazolinone with CH₂CONHCH₂CH(CH₃)OH] | 500<br>250<br>125 | | 26.1<br>22.4<br>0.2 | |
| [structure: Cl-benzothiazolinone with CH₂CONH-C₆H₄-OH] | 500<br>250<br>125 | 13.7<br>-29.0<br>1.2 | 9.4<br>8.6<br>0.4 | 21.0<br>8.5<br>8.1 |
| [structure: Cl-benzothiazolinone with CH₂CONHCH₂CH₂CH₂OC₂H₅] | 500<br>250<br>125 | 13.0<br>3.2<br>14.4 | | |
| [structure: CF₃-benzothiazolinone with CH₂CONHCH₃] | 500<br>250<br>125 | | 28.8<br>28.5<br>14.2 | |

2. The inhibitory effect of 3-[4-(2-hydroxyethyl)-1-piperazinylcarbonylmethyl]-5-chloro-2(3H)-benzothiazolinone on inflammatory exudate induced by formalin.

Method.

Wistar strain male rats each weighing 150 to 200 g were divided into two groups. One group (10 rats) received orally 1 ml of a suspension of the test drug in 1 percent carboxymethylcellulose solution per 100 g of the body weight (the drug treated group); the other group (10 rats) received 1 ml of 1 percent carboxymethylcellulose solution alone per 100 g of the body weight in the similar fashion (control group). One hour after administration, formalin (5 %, 1 ml) was given intraperitoneally to the animals to induce peritonitis. After 20 hours, the amount of ascitic fluid was measured. The rate of induced ascitic fluid and the inhibitory percent of induced ascitic fluid were calculated from the following equations:

Rate of induced ascitic fluid $= [(t - T)/T] \times 100$ (%)

$T$: Amount of ascitic fluid before formalin being given.
$t$: Amount of ascitic fluid 20 hours after formalin being given.

Inhibitory percent of induced ascitic $= [(C - D)/C] \times 100$ (%)

$C$: Rate of induced asicitic fluid in control group.
$D$: Rate of induced ascitic fluid in the drug treated group.

Results.

The results are shown in the following table:

TABLE 5

| Test drug | Dose (mg/kg) | Inhibitory percent |
|---|---|---|
| 3-[4-(2-Hydroxy-ethyl)-1-piperazinyl-carbonylmethyl]-5-chloro-2(3H)-benzothiazolinone | 500<br>250<br>125 | 34.7<br>47.2<br>-0.005 |
| Oxyphenylbutazone | 500<br>250<br>125 | <br><br>-4.9 |

Note: In the groups which received oxyphenylbutazone at a dose of 500 mg/kg and of 250 mg/kg, no measurement was made due to death of almost all animals.

3. Gastric ulcer formation.

Method.

Groups of 10 Wistar strain male rats, each consisting of 10 animals, received orally 1 ml of a suspension of the test drug in 1 percent carboxymethylcellulose solution per 100 g of the body weight. After 10 hours, the same dose was further given orally, and 5 hours following this, the animals were observed macroscopically for the presence of gastric bleeding. Depending on the state of bleeding, the marks from 0 (no bleeding) to 5 (the severest bleeding) were given.

Results.

The results are shown in the following Table:

TABLE 6

| Test drug | Dose (mg/kg) | 0 | 1 | 2 | 3 | 4 | 5 |
|---|---|---|---|---|---|---|---|
| 3-[4-(2-Hydroxyethyl)-1-piperazinylcarbonylmethyl]-5-chloro-2(3H)-benzothiazolinone | 500 | 1 | 5 | 2 | 1 | 0 | 0 |
| | 250 | 5 | 4 | 1 | 0 | 0 | 0 |
| | 125 | 5 | 4 | 0 | 0 | 0 | 0 |
| Phenylbutazone | 125 | 0 | 2 | 2 | 1 | 2 | 1 |

Note: Of the group which received 500 mg/kg of 3-[4-(2-hydroxyethyl)-1-piperazinylcarbonylmethyl]-5-chloro-2(3H)-benzothiazolinone, a rat was dead from unknown cause. Of the group given 250 mg/kg, a rat suffered from pneumonia. In the group given phenylbutazone, two animals were dead after the first administration.

As clearly seen from the above test results, the compounds of Formula I are characterized by their potent antiinflammatory effect. Furthermore, these compounds are lower in side effects and may be safely applied to human beings.

Some of the compounds of Formula I are also useful as anti-arrhythmic agents.

Accordingly, the compounds of Formula I are useful in treatment of inflammatory conditions associated with pain, flare and/or swelling, which are provoked by changes in cellular and vascular permeability, vasodilation, exudation of liquid constitution of the blood and of cellular constitution, and/or proliferation of connective tissue cells and formation of granulation tissues. The compounds of Formula I are also useful in treatment of certain arrhythmias. Conversion of atrial fibrillation, abolition of parcrysmal atrial tachycardia, and management of ventricular ectopic beats represent typical examples of therapeutic amis.

The compounds of Formula I can be administered by the conventional methods, the conventional types of unit dosages or with the conventional pharmaceutical carriers to produce an antiinflammatory or antiarrhythmic effect in human beings and animals. Thus, they can be used in the form of pharmaceutical preparations, which contain them in admixture with a pharmaceutical organic or inorganic carrier material suitable for enteral, parenteral or local applications. Oral administration by the use of tablets, capsules or in liquid form such as suspensions, solutions or emulsions is particularly advantageous. When formed into tablets, the conventional binding and disintegrating agents used in therapeutic unit dosages can be employed. Illustrative of binding agents there can be mentioned glucose, lactose, gum acacia, gelatin, mannitol, starch paste, magnesium trisilicate and talc. Illustrative of disintegrating agents there can be mentioned corn starch, keratin, colloidal silica and potato starch. When administered as liquids the conventional liquid carriers can be used.

The unit dosage or therapeutically effective quantity of the compounds of Formula I for human beings for the therapeutic uses of the invention can vary over wide limits such as that of about 0.1 of a grain to about 25 grains or more such as 50 grains. The upper limit is limited only by the degree of effect desired and economic considerations. For oral administration it is preferable to employ from about 1 to about 10 grains of the therapeutic agent per unit dosage. It is indicated from animal experiments that about 1 to about 10 grain dosages administered orally four times daily as needed will provide a preferred daily dosage. Of course, the dosage of the particular therapeutic agent used can vary considerably, such as the age of the patient and the degree of therapeutic effect desired. Each unit dosage form of the novel therapeutic compounds can contain from about 5 to about 95 percent of the novel therapeutic agents by weight of the entire composition with the remainder comprising conventional pharmaceutical carriers. By the term pharmaceutical carrier it is intended to include non-therapeutic materials which are conventionally used with unit dosages and includes fillers, diluents, binders, lubricants, disintegrating agents and solvents. Of course, it is possible to administer the novel therapeutics, i.e. the pure compounds, without the use of a pharmaceutical carrier.

Practical and presently-preferred embodiments of this invention are illustratively shown in the following examples.

Example 1

A. A mixture of 5-chloro-2(3H)-benzothiazolinone (5.0 g), 4'-hydroxy-2-chloroacetanilide (5.54 g), potassium carbonate (3.75 g) and acetone (20 ml) is heated while refluxing for 6 hours. The reaction mixture is filtered while hot. The filtrate is concentrated to dryness. The residue is crystallized from ethyl acetate to give 4'-hydroxy-5-chloro-2-oxo-3-benzothiazolineacetanilide (4.2 g) as crystals. M.P. 249° to 251°C.

B. A mixture of 5-trifluoromethyl-2(3H)-benzothiazolinone (4.0 g), 4'-ethoxy-2-chloroacetanilide (4.01 g), potassium carbonate (3.5 g), sodium iodide (trace) and acetone (120 ml) is heated while refluxing for 6 hours. After removal of the acetone by distillation, the residue is admixed with water (200 ml) and filtered. The collected crystals are recrystallized from ethanol to give 4'-ethoxy-5-trifluoromethyl-2-oxo-3-benzothiazolineacetanilide (3.4 g) as crystals. M.P. 252° to 254°C.

Other examples of the compounds which can be prepared in the similar manner include: 4'-acetyl-5-chloro-2-oxo-3-benzothiazolineacetanilide (M.P. 282° to 283°C), 4',5-dichloro-2-oxo-3-benzothiazolineacetanilide (M.P. 241° to 242°C), 5-trifluoromethyl-2-oxo-3-benzothiazolineacetamide (M.P. 227° to 229°C), 2',6'-dimethyl-5-chloro-2-oxo-3-benzothiazolineacetanilide (M. P. 284°C), 3-[4-(2-hydroxyethyl)-1-piperazinylcarbonylmethyl]-5-chloro-2(3H)-benzothiazolinone (M.P. 159° to 161°C), 3-(4-hydroxypiperizinocarbonylmethyl)-5-chloro-2(3H)-benzothiazolinone (M.P. 178° to 181°C), N-[2-(N,N-diethylamino)ethyl]-2-oxo-3-benzothiazolineacetamide (maleate, M.P. 138.5° to 139.5°C), 3-[4-(2-hydroxyethyl)-1-piperazinylcarbonylmethyl]-2(3H)-benzothiazolinone (maleate, M.P. 197° to 198°C), 3-(4-methyl-1-piperazinylcarbonylmethyl)-5-chloro-2(3H)-benzothiazolinone (M.P. 178° to 179°C), 3-morpholinocarbonylmethyl-5-chloro-2(3H)-benzothiazolinone (M.P. 199° to 200°C), 3-(4-phenyl-1-piperazinylcarbonylmethyl)-5-trifluoromethyl-2(3H)-benzothiazolinone (M.P. 188° to 190°C), 3-(4-methyl-1-piperazinylcarbonylmethyl)-5-trifluoromethyl-2(3H)-benzothiazolinone (M.P. 193° to 195°C), 3-[4-(2-hydroxyethyl)-1-piperazinylcarbonylmethyl]-5-trifluoromethyl-2(3H)-benzothiazolinone (M.P. 166° to 167.5°C), 3-(4-methyl-1-homopiperazinylcarbonylmethyl)-5-chloro-2(3H)-benzothiazolinone (M.P. 136° to 137.5°C), N-(2-hydroxyethyl)-6-chloro-2-oxo-3-benzothiazolineacetamide (M.P. 222° to 223°C), N-methyl-5-trifluoromethyl-2-oxo-3-benzothiazolinacetamide (M.P. 223° to 224°C), 5-chloro-2-oxobenzothiazolin-3-ylacetylglycine ethyl ester (M.P. 194.5° to 195.5°C), 5-chloro-2-oxobenzothiazolin-3-ylacetylglycine (M.P. 246° to 247°C), 3-(4-acetylmethyl-1-piperazinylcarbonylmethyl)-5-chloro-2(3H)-benzothiazolinone (M.P. 158° to 160°C), 3-[2,5-dimethyl-4-(2-propinyl)-1-piperazinylcarbonylmethyl]-5-chloro-2(3H)-benzothiazolinone (M.P. 145° to 146°C), 3-[2,5-dimethyl-4-(1-ethoxycarbonylmethyl)-1-piperazinylcarbonylmethyl]-5-chloro-2(3H)-benzothiazolinone (M.P. 131° to 138°C), 3-[2,5-dimethyl-4-(2-hydroxyethyl)-1-piperazinylcarbonylmethyl]-5-chloro-2(3H)-benzothiazolinone (M.P. 139° to 141°C), 3-(4-benzoyl-1-piperazinylcarbonylmethyl)-5-trifluoromethyl-3(2H)-benzothiazolinone (M.P. 183° to 184°), 3-[[4-(2 -hydroxyethyl)-1-piperazinylcarbonyl]-1-ethyl]-5-chloro-benzothiazolinone (M.P. 80° to 92°C), 1-[4-(2-hydroxyethyl)-1-piperazinylcarbonylmethyl]-3-methyl-6-chloro-2(3H)-benzimidazolinone (M.P. 172° to 174°), 1-[4-(2-hydroxyethyl)-1-piperazinylcarbonylmethyl]-3-methyl-5-chloro-2(3H)-benzimidazolinone (M.P. 171° to 173°C), 1-[4-(2-hydroxypropyl)-1-piperazinylcarbonylmethyl]-3-methyl-6-chloro-2(3H)-benzimidazolinone (M.P. 202° to 206°C), 3-[4-(2-hydroxypropyl)-1-piperazinylcarbonylmethyl]-5-chloro-2(3H)-benzothiazolinone (M.P. 104° to 105°C), 3-[4-(2-hydroxyethyl)-1-piperazinylcarbonylmethyl]-6-ethoxy-2(3H)-benzothiazolinone (M.P. 154° to 155°C), 3-[4-(2-phenylacetoxyethyl)-1-piperazinylcarbonylmethyl]-5-chloro-2(3H)-benzothiazolinone (hydrochloride, M.P. 206°-207°C), 3-[4-[2-(3, 4, 5-trimethoxybenzoyloxy)ethyl]-1-piperazinylcarbonylmethyl]-5-chloro-2(3H)-benzothiazolinone [maleate, M.P. 123°-130°C(decomp.)], 3-[4-(3phenylacetoxypropyl)-1-piperazinylcarbonylmethyl]-5-chloro-2(3H)-benzothiazolinone [hydrochloride, M.P. 250°C(decomp.)], 1-[4-(2-pamitoyloxyethyl)-1-piperazinylcarbonylmethyl]-3-methyl-6-chloro-2(3H)-benzimidazolinone (M.P. 97°-98°C), 3-[4-(2-stearoyloxyethyl)-1-piperazinylcarbonylmethyl]-5-trifluoromethyl-2(3H)-benzothiazolinone (M.P. 95°-96°C), 3-[4-(2-lauroyloxyethyl)-1-piperazinylcarbonylmethyl]-5-chloro-2(3H)-benzothiazolinone (maleate, M.P. 168°-171°C), 3-[4-(2-linoloyloxyethyl)-1-piperazinylcarbonylmethyl]-5-chloro-2(3H)-benzothiazolinone [maleate, M.P. 150°-152°C (decomp.)], 3-[4-(2-stearoyloxyethyl)-1-piperazinylcarbonylmethyl]-5-chloro-2(3H)-benzothiazolinone (½$H_2O$, M.P. 74°-76°C), etc.

Example 2

A. A mixture of ethyl 2-oxo-3-benzothiazolineacetate (1.2 g), 2-(N,N-diethylamino)ethylamine (1.0 g) and anhydrous ethanol (1.0 g) is heated while refluxing for 48 hours. After removal of the ethanol by distillation, the residue is extracted with dilute hydrochloric acid. The extract is made alkaline with 10 percent sodium hydroxide solution and shaken with chloroform. The chloroform layer is washed with water, dried and concentrated. The residue is crystallized from ethanol to give N-[2-(N,N-diethylamino)ethyl]-2-oxo-3-benzothiazolineacetamide (2.0 g) as colorless scales. M.P. 138.5° to 139.5°C. This base is treated with maleic acid in a convertional manner to afford the maleate. M.P. 125° to 128°C.

B. A solution of ethyl 2-oxo-3-benzothiazolineacetate (600 mg) in excess of 1-(2-hydroxyethyl)piperazine is heated at 100°C for about 20 hours. After cooling, a large amount of water is added thereto, and the resulting mixture is extracted with chloroform. The coloroform extract is washed with water and shaken with 10 percent hydrochloric acid. The hydrochloric acid layer is washed with ether, made alkaline with 20 percent sodium hydroxide solution and extracted with chloroform. The chloroform extract is washed with water, dried and concentrated. The residue is crystallized from ethanol to give 3-[4-(2-hydroxyethyl)-1-piperazinylcarbonylmethyl]-2(3H)-benzothiazolinone as crystals. M.P. 197° to 198°C (maleate).

C. A mixture of ethyl 5-trifluoromethyl-2-oxo-3-benzothiazolineacetate (1.5 g) and morpholine (6.0 g) is heated at 110°C for 15 hours while stirring. After cooling, the reaction mixture is combined with chloroform and washed with water, dilute hydrochloric acid and water is order. The chloroform solution is dried over magnesium sulfate and concentrated. The residue is crystallized from ethanol to give 3-morpholinocarbonylmethyl-5-trifluoromethyl-2(3H)-benzothiazolinone (0.65 g) as white needles. M.P. 188° to 190°C.

D. A solution of ethyl 5-chloro-2-oxo-3-benzothiazolineacetate (4.0 g) in 1-(2-hydroxyethyl)piperazine is heated at 100°C for 24 hours. After cooling, the resulting mixture is extracted with chloroform. The chloroform extract is washed with water and shaken with 10 percent hydrochloric acid. The hydrochloric acid layer is washed with chloroform, made alkaline with 10 percent sodium hydroxide solution and extracted with chloroform. The chloroform extract is washed with water, dried over magnesium sulfate and concentrated. The residual oil (5.5 g) is allowed to stand to form crystals, which are recrystallized from a mixture of ethyl acetate (40 ml) and ethanol (15 ml) to give 3-[4-(2-hydroxyethyl)-1-piperazinylcarbonylmethyl]-5-chloro-2(3H)-benzothiazolinone (3.2 g) as colorless crystals. M.P. 159° to 161°C.

Other examples of the compounds which can be prepared in the similar manner include: N-[2-(N,N-diethylamino)-ethyl]-5-chloro-2-oxo-3-benzothiazolineacetamide (M.P. 127° to 128°C; maleate, M.P. 119° to 121°C), N-(2-morpholinoethyl)-2-oxo-3-benzothiazolineacetamide (M. P. 169° to 170°C), N-[3-(N,N-dimethylamino)propyl]-2-oxo-3-benzothiazolineacetamide (maleate, M.P. 155° to 156°C), 3-(4-methyl-1-piperazinylcarbonylmethyl)-5-chloro-2(3H)-benzothiazolinone (M.P. 178° to 179°C), 3-(4-phenyl-1-piperazinylcarbonylmethyl)-5-chloro-2(3H)-benzothiazolinone (M.P. 179° to 180°C), 3-morpholinocarbonylmethyl-5-chloro-2(3H)-benzothiazolinone (M.P. 199° to 200°C), N-[2-(N,N-diethylamino)ethyl]-6-methyl-2-oxo-3-benzothiazolineacetamide (maleate, M.P. 113° to 114.5°C), N-[2-(N,N-diethylamino)ethyl]-6-ethoxy-2-oxo-3-benzothiazolineacetamide (M.P. 131°C), 3-(4-phenyl-1-piperazinylcarbonylmethyl)-5-trifluoromethyl-2(3H)-benzothiazolinone (M.P. 188° to 190°C), 3-(4-methyl-1-piperazinylcarbonylmethyl)-5-trifluoromethyl-2(3H)-benzothiazolinone (M.P. 193° to 195°C), 3-[4-(2-hydroxyethyl)-1-piperazinylcarbonylmethyl]-5-trifluoromethyl-2(3H)-benzothiazolinone (M.P. 166° to 167.5°C), 3-[4-(2-hydroxyethyl)-1-piperazinylcarbonylmethyl]-4-chloro-2(3H)-benzothiazolinone (M.P. 189° to 191°C), 3-[4-(2-hydroxyethyl)-1-piperazinylcarbonylmethyl]-6-chloro-2(3H)-benzothiazolinone (M.P. 171° to 173°C), 3-(4-methyl-1-homopiperazinyl)-5-chloro-2(3H)-benzothiazolinone (M.P. 136° to 137.5°C), 1-[4-(2-hydroxyethyl)-1-piperazinylcarbonylmethyl]-3-methyl-5-chloro-2(3H)-benzimidazolinone (M.P. 171° to 173°C), 3-(4-hydroxypiperidinocarbonylmethyl)-5-trifluoromethyl-2(3H)-benzothiazolinone (M.P. 197° to 199°C), 3-[4-(2-hydroxyethyl)-1-piperazinylcarbonylmethyl]-4-chloro-2(3H)-benzothiazolinone (M.P. 189° to 191°C), 4'-hydroxy-5-chloro-2-oxo-3-benzothiazolineacetanilide (M.P. 249° to 251°C), 5-trifluoromethyl-2-oxo-3-benzothiazolineacetamide (M.P. 227° to 229°C), N-(2-hydroxyethyl)-6-chloro-2-oxo-3-benzothiazolineacetamide (M.P. 222° to 223°C), 3-(1-piperazinyl)carbonylmethyl-5-chloro-2(3H)-benzothiazolinone (M.P. 211° to 212°C), 3-[4-(2-hydroxypropyl)-1-piperazinylcarbonylmethyl]-5-chloro-2(3H)-benzothiazolinone (M.P. 104° to 105°C), 3-(4-acetylmethyl-1-piperazinylcarboylmethyl)-5-chloro-2(3H)-benzothiazolinone (M.P. 158° to 160°C), 3-[2,5-dimethyl-4-(2-propinyl)-1-piperazinylcarbonylmethyl]-5-chloro-2(3H)-benzothiazolinone (M.P. 145° to 146°C), 3-[4-(3-hydroxypropyl)-1-piperazinylcarbonylmethyl]-5-chloro-2(3H)-benzothiazolinone (M.P. 118° to 120°C), 3-(2,4,5-trimethyl-1-piperazinylcarbonylmethyl)-5-chloro-2(3H)-benzothiazolinone (M.P. 167° to 173°C), 3-(4-benzyl-1-piperazinylcarbonylmethyl)-5-chloro-2(3H)-benzothiazoline (M.P. 152° to 154° C), 3-(4-benzyl-1-piperazinylcarbonylmethyl)-5-trifluoromethyl-2(3H)-benzothiazolinone (M.P. 183° to 184°C), 3-[4-(2-hydroxyethyl)-1-piperazinylcarbonylmethyl]-7-chloro-2(3H)-benzothiazolinone (M.P. 170° to 172°C), 3-[[4-(2-hydroxyethyl)-1-piperazinyl-carbonylmethyl]-1-ethyl]-5-chloro-2(3H)-benzothiazolinone (M.P. 89° to 92°C), N-[2-[N-methyl-N-(2-hydroxyethyl)amino]ethyl]-5-chloro-2-oxo-3-benzothiazolinacetamide (M.P. 120° to 122°C), N-(2-hydroxypropyl)-6-chloro-2-oxo-3-benzothiazolinacetamide (M.P. 169° to 173°C), 3-[4-(2-hydroxyethyl)-1-piperazinylcarbonylmethyl]-6-ethoxy-2(3H)-benzothiazolinone (M.P. 154° to 155°C), etc.

Example 3

A. A mixture of 6-chloro-2-oxo-3-benzothiazolineacetic acid (5.04 g) and thionyl chloride (50 ml) is heated while refluxing for 2 hours, and the thionyl chloride is distilled off. Thus obtained 6-chloro-2-oxo-3-benzothiazolineacetyl chloride is dissolved in a mixture of benzene (60 ml) and chloroform (30 ml), and the resultant solution is dropwise added to a mixture of benzene (12 ml), 2-aminoethanol (3.4 g), water (5.6 ml) and sodium carbonate (1.4 g) cooled with ice-water while stirring. The resulting mixture is stirred at room temperature for 40 minutes and, after addition of water (70 ml), for several minutes. The precipitate is collected by filtration, washed with water and recrystallized from a mixture of ethanol and chloroform to give N-(2-hydroxyethyl)-6-chloro-2-oxo-3-benzothiazolineacetamide (2.0 g) as white cotton-like crystals. M.P. 222° to 223°C.

B. A mixture of 5-chloro-2-oxo-3-benzothiazolineacetic acid (4.4 g) and thionyl chloride is heated while refluxing for several hours, and the thionyl chloride is distilled off. The obtained 5-chloro-2-oxo-3-benzothiazolinylacetyl chloride is dissolved in benzene, and the resultant solution is dropwise added to a mixture of 2-(2-aminoethoxy)ethanol (4.0 g), sodium carbonate (2.2 g), water (12 ml) and benzene (40 ml) cooled in an ice-water bath while stirring. The resulting mixture is stirred at room temperature for 3 hours and at 60°C for 30 minutes. After cooling, the separated crystals are collected by filtration and recrystallized from water to give N-[2-(2-hydroxyethoxy)ethyl]-5-chloro-2-oxo-3-benzothiazolineacetamide (3.6 g) as colorless scales. M.P. 133° to 134°C.

Other examples of the compounds which can be prepared in the similar manner include: N-methyl-5-trifluoromethyl-2-oxo-3-benzothiazolineacetamide (M.P. 223° to 224°C), N,N-diethyl-5-chloro-2-oxo-3-benzothiazolineacetamide (M.P. 148° to 149°C), N-(2-hydroxypropyl)-7-chloro-2-oxo-3-benzothiazolineacetamide (M.P. 189° to 191°C), N-(2-hydroxypropyl)-5-chloro-2-oxo-3-benzothiazolineacetamide (M.P. 155° to 156°C), N-(2-hydroxyethyl)-5-chloro-2-oxo-3-benzothiazolineacetamide (M.P. 223° to 224°C), N-(2-hydroxyethyl)-N-methyl-5-chloro-2-oxo-3-benzothialolineacetamide (M.P. 115° to 117°C), 3-(1-piperazinyl)carbonylmethyl-5-chloro-2(3H)-benzothiazolinone (M.P. 211° to 212°C), 5-chloro-2-oxobenzothiazolin-3-ylacetylglycine ethyl ester (M.P. 194.5° to 195.5°C), 5-chloro-2-oxobenzothiazolin-3ylacetyl-β-alanine ethyl ester (M.P. 150° to 151°C), 5-chloro-2-oxobenzothiazolin-3-ylacetylglycine (M.P. 246° to 247°C), 5-chloro-2-oxobenzothiazolin-3-ylacetyl-β-alanine (M.P. 187° to 189°C), 3-[4-(2-hydroxyethyl)-1-piperazinylcarbonylmethyl]-6-chloro-2(3H)-benzothiazolinone (M.P. 174° to 176°C), 3-[4-(2-hydroxyethyl)-1-piperazinylcarbonyl-methyl]-5-chloro-2(3H)-benzothiazolinone (M.P. 159° to 161°C), 3-(4-hydroxypiperizinocarbonylmethyl)-5- chloro-2(3H)-benzothiazolinone (M.P. 178° to 181°C), N-[2-(N,N-diethylamino)-ethyl]-2-oxo-3-benzothiazolineacetamide (M.P. 138.5° to 139.5°C), 3-[4-(2-hydroxyethyl)-1-piperazinylcarbonylmethyl]-2(3H)-benzothiazolinone (maleate, M.P. 197° to 198°C), 3-morpholinocarbonylmethyl-5-trifluoromethyl-2(3H)-benzothiazolinone (M.P. 188° to 190°C), 3-(4-methyl-1-piperazinylcarbonylmethyl)-5-chloro-2(3H)-benzothiazolinone (M.P. 178° to 179°C), 3-(4-phenyl-1-piperazinylcarbonylmethyl)-5-trifluoromethyl-2(3H)-benzothiazolinone (M.P. 188° to 190°C), 3-(4-methyl-1-homopiperazinylcarbonylmethyl)-5-chloro-2(3H)-benzothiazolone (M.P. 136° to 137.5°C), N-(2-ethoxyethyl)-5-chloro-2-oxo-3-benzothiazolineacetamide (M.P. 171° to 173°C), 3-[4-(2-hydroxypropyl)-1-piperazinylcarbonylmethyl]-5-chloro-2(3H)-benzothiazolinone (M.P. 104° to 105°C), 1-[4-(2-hydroxyethyl)-1-piperazinylcarbonylmethyl]-3-methyl-5-chloro-2(3H)-benzimidazolinone (M.P. 171° to 173°C), 1-[4-(2-hydroxyethyl)-1-piperazinylcarbonylmethyl]-3-methyl-6-chloro-2(3H)-benzimidazolinone (M.P. 172° to 174°C), 1-[4-(2-hydroxypropyl)-1-piperazinylcarbonylmethyl]-3-methyl-6-chloro-2(3H)-benzoimidazolinone (M.P. 202° to 206°C), 3-(4-acetylmethyl-1-piperazinylcarbonylmethyl)-5-chloro-2(3H)-benzothiazolinone (M.P. 158° to 160°C), 3-[2,5-dimethyl-4-(2-propinyl)-1-piperazinylcarbonylmethyl]-5-chloro-2(3H)-benzothiazolinone (M.P. 145° to 146°C), 3-[4-(3-hydroxypropyl)-1-piperazinylcarbonylmethyl]-5-chloro-2(3H)-benzothiazolinone (M.P. 118° to 120°C), 3-(2,4,5-trimethyl-1-piperazinylcarbonylmethyl)-5-chloro-2(3H)-benzothiazolinone (M.P. 167° to 173°C), 3-(4-benzyl-1-piperazinylcarbonylmethyl)-5-chloro-2(3H)-benzothiazolinone (M.P. 152° to 154°C), 3-(4-benzyl-1-piperazinylcarbonylmethyl)-5-trifluoromethyl-2(3H)-benzothiazolinone (M.P. 183° to 184°C), 3-[4-(2-hydroxyethyl)-1-piperazinylcarbonylmethyl]-7-chloro-2(3H)-benzothiazolinone (M.P. 170° to 172°C), 3-[[4-(2-hydroxyethyl)-1-piperazinylcarbonylmethyl]-1-ethyl]-5-chloro-2(3H)-benzothiazolinone (M.P. 89° to 92°C), N-[2-[N-methyl-N(2-hydroxyethyl) amino]ethyl-5-chloro-2-oxo-3-benzothiazolinacetamide (M.P. 120° to 122°C), N-(2-hydroxypropyl)-6-chloro-2-oxo-3-benzothiazolinacetamide (M.P. 169° to 173°C), 3-[4-(2hydroxyethyl)-1-piperazinylcarbonylmethyl]-6-ethoxy-2(3H)-benzothiazolinone (M.P. 154° to 155°C), etc.

Example 4

A. A mixture of 5-chloro-2-oxo-3-benzothiazolineacetic acid (5.0 g) and thionyl chloride (50 ml) is heated while refluxing for 2 hours, and the thionyl chloride is distilled off. The thus obtained 5-chloro-2-oxo-3-benzothiazolineacetyl chloride is dissolved in anhydrous benzene (50 ml), and the resultant solution is dropwise added to a mixture of anhydrous benzene (100 ml), aziridine (2.3 g), potassium carbonate (5.03 g) and water (15 ml) cooled at 5° to 10°C while stirring. The resulting mixture is stirred at the same temperature for 10 minutes. The reaction mixture is washed with 10 percent sodium carbonate solution and water in order and dried over magnesium sulfate. After removal of the solvent, the residue is crystallized from anhydrous benzene to give 5-chloro-3-(1-aziridinylcarbonylmethyl)-2(3H)-benzothiazolinone (5.0 g) as white granules. M.P. 137° to 139°C.

B. 5-Chloro-3-(1-aziridinyl)carbonylmethyl-2(3H)-benzothiazolinone (5.2 g) as above prepared is added to 99 percent ethanol (60 ml), and the resulting mixture is heated while refluxing for 10 minutes. The reaction mixture is allowed to cool. The separated crystals are collected by filtration to give N-(2-ethoxyethyl)-5-chloro-2-oxo-3-benzothiazolineacetamide (3.2 g) as white scales. M.P. 171° to 173°C.

C. 5-Chloro-3-(1-aziridinylcarbonylmethyl)-2(3H)-benzothiazolinone (0.7 g) as above prepared is added to N,N-dicyclohexylamine (1.5 g), and the resulting mixture is heated at 110°C for 20 hours. The reaction mixture is allowed to cool. The separated crystals are collected by filtration, washed with benzene and petroleum benzin in order and recrystallized from ethanol to give N-[2-(N,N-dicyclohexylamino)-ethyl]-5-chloro-2-oxo-3-benzothiazolineacetamide (0.5 g) as white crystals. M.P. 209° to 210°C.

D. A mixture of 5-chloro-2-oxo-3-benzothiazolineacetic acid (2.0 g) and thionyl chloride (20 ml) is heated while refluxing for 2 hours, and the thionyl chloride is distilled off. The thus obtained 5-chloro-2-oxo-3-benzothiazolineacetyl chloride is dissolved in anhydrous benzene (20 ml), and the resultant solution is dropwise added to a mixture of aziridine (0.424 g) and anhydrous benzene (10 ml) kept at 10° to 15°C while stirring. The resulting mixture is stirred at room temperature for 3 hours and allowed to stand overnight. After removal of the solvent, the residue is dissolved in a mixture of water (50 ml) and 10 percent sodium hydrogen carbonate solution (80 ml), and the resulting solution is stirred for several minutes. The separated crystals are collected by filtration, washed with water, dissolved in a mixture of ethanol (70 ml) and acetone (30 ml) and treated with active carbon. Then, the solution is concentrated to about 60 ml and allowed to stand overnight. The separated crystals are collected by filtration and recrystallized from ethanol to give N-(2-chloroethyl)-5-chloro-2-oxo-3-benzothiazolineacetamide (1.2 g) as white crystals. M.P. 192° to 194°C.

E. 2-Oxo-3-benzothiazolineacetic acid is treated as above to give N-(2-chloroethyl)-2-oxo-3-benzothiazolineacetamide. M.P. 159° to 162°C.

Example 5

A. N-(2-Chloroethyl)-5-chloro-2-oxo-3-benzothiazolineacetamide (1.0 g) and N-methylaniline (1.62 g) are charged in a steel bomb tube and heated at 90°C for 5.5 hours. Then, 10 percent hydrochloric acid and ethyl acetate are added thereto. The ethyl acetate layer is extracted with 10 percent hydrochloric acid. The hydrochloric acid extract and the hydrochloric acid layer are combined together, washed with ethyl acetate and made alkaline with 10 percent sodium hydroxide solution. The separated crystals are extracted with chloroform. The chloroform extract is washed with water, dried over anhydrous magnesium sulfate and concentrated. The oily residue is crystallized from petroleum benzin and recrystallized from ethanol to give N-[2-(N-methylanilino)-ethyl]-5-chloro-2-oxo-3-benzothiazolineacetamide (0.45 g) as white crystals. M.P. 155° to 157°C.

B. N-(2-Chloroethyl)-2-oxo-3-benzothiazolineacetamide (3.0 g) and N-methylaniline (4.75 g) are charged in a steel bomb tube and heated at 110°C for 5.5 hours. The reaction mixture is treated as above. The obtained pale brown cystals (6.7 g) are recrystallized from ethanol to give N-[2-(N-methylaniline)ethyl]-2-oxo-3-benzothiazolineacetamide (2.5 g) as white needles. M.P. 143° to 145°C.

Examples 6

To a solution of 3-(1-piperazinylcarbonylmethyl)-5-chloro-2(3H)-benzothiazolinone (0.45 g) in methanol (30 ml), there is added propylene oxide (0.25 g), and the resulting mixture is heated at 50°C for 5 hours, during which propylene oxide (0.3 g) is added twice thereto. The reaction mixture is concentrated under reduced pressure. The residual oil is crystallized from petroleum benzin and recrystallized from a mixture of ethyl acetate and petroleum benzin to give 3-[4 -(2-hydroxypropyl)-1-piperazinylcarbonylmethyl]-5-chloro-2(3H)-benzothiazolinone (0.43 g) as colorless needles. M.P. 112° to 115°C. Other examples of the compounds which can be prepared in the similar manner include: 3-[4-(2-hydroxyethyl)-1-piperazinylcarbonylmethyl]-5-chloro-2(3H)-benzothiazolinone (M.P. 159° to 161°C), 3-[4-(2-hydroxyethyl)-1-piperazinylcarbonylmethyl]-6-chloro-2(3H)-benzothiazolinone (M.P. 175° to 177°C), 3-[4-(2-hydroxyethyl)-1-piperazinylcarbonylmethyl]-5-trifluoromethyl-2(3H)-benzothiazolinone (M.P. 166° to 167.5°C), 3-[4-(2-hydroxyethyl)-1-piperazinylcarbonylmethyl]-4-chloro-2(3H)-benzothiazolinone (M.P. 189° to 191°C), N-(2 -hydroxyethyl)-6-chloro-2oxo-3-benzothiazolineacetamide (M.P. 222° to 223°C), N-(2-hydroxypropyl)-7-chloro-2-oxo-3-benzothiazolineacetamide (M.P. 189° to 191°C), N-(2-hydroxypropyl)-5-chloro-2-oxo-3-benzothiazolineacetamide (M.P. 155° to 156°C), N-(2-hydroxyethyl)-5-chloro-2-oxo-3-benzothiazolineacetamide (M.P. 223° to 224°C), 1-[4-(2-hydroxyethyl)-1-piperazinylcarbonyl]-3-methyl-6-chloro-2(3H)-benzimidazolinone (M.P. 172° to 174°C), 1-[4-(2-hydroxypropyl)-1-piperazinylcarbonylmethyl]-3-methyl-6-chloro-2(3H)-benzimidazolinone (M.P. 202° to 206°C), 3-[4(2-hydroxyethyl)-1-piperazinylcarbonylmethyl]-6-ethoxy-2(3H)-benzothiazolinone (M.P. 154° to 155°C), 3-[4-(2-hydroxybutyl)-1-piperazinylcarbonylmethyl]-5-chloro-2(3H)-benzothiazolinone (M.P. 95° to 98°C), etc.

Example 7

A mixture of 3-(1-piperazinyl)carbonylmethyl-5-chloro-2(3H)-benzothiazolinone (500 mg), anhydrous potassium carbonate (400 mg), 2-hydroxyethyl bromide (300 mg) and anhydrous ethanol (20 ml) is heated while refluxing for 5 hours. The reaction mixture is concentrated under reduced pressure. The residue is extracted with chloroform. The chloroform layer is dried over magnesium sulfate and concentrated. The residue is crystallized from a mixture of ethyl acetate and ethanol to give 3-[4-(2-hydroxyethyl-1-piperazinylcarbonylmethyl]-5-chloro-2(3H)-benzothiazolinone (370 mg) as crystals. M.P. 159° to 160°C.

Other examples of the compounds which can be prepared in the similar manner using 4, 5, 6 or 7-substituted or unsubstituted-3-(1-piperazinyl)carbonyl(lower)-alkyl-2(3H)-benzothiazolinone as the starting compound include: 3-[4-(1-carbethoxyethyl)-1-piperazinylcarbonylmethyl]-5-chloro-2(3H)-benzothiazolinone (maleate, M.P. 152° to 154°C), 3-(4-acetylmethyl-1-piperazinylcarbonylmethyl)-5-chloro-2(3H)-benzothiazolinone (M.P. 158° to 160°C), 3-[4-(3-hydroxypropyl)-1-piperazinylcarbonylmethyl]-5-chloro-2(3H)-benzothiazolinone (M.P. 118° to 120°C), 3-(2,5-dimethyl-4-carbethoxy-methyl-1-piperazinylcarbonylmethyl)-5-chloro-2(3H)-benzothiazolinone (M.P. 131° to 138°C), 3-[2,5-dimethyl-4-(2-propinyl)-1-piperazinylcarbonylmethyl]-5-chloro-2(3H)-benzothiazolinone (M.P. 145° to 146°C), 3-(2,5-dimethyl-4-allyl-1-piperazinylcarbonylmethyl)-5-chloro-2(3H)-benzothiazolinone (M.P. 136° to 137°C), 3-(2,4,5 -trimethyl-1-piperazinylcarbonylmethyl)-5-chloro-2(3H)-benzothiazolinone (M.P. 167° to 173°C), 3-[2,5-dimethyl-4-(2-hydroxyethyl)-1-piperazinylcarbonylmethyl]-5-chloro-2(3H)-benzothiazolinone (M.P. 139° to 140°C), 3-[4-(3',4'-dimethoxyphenethyl)-1-piperazinylcarbonylmethyl]-5-chloro-2(3H)-benzothiazolinone (M.P. 189° to 191°C), 3-(4-acetylmethyl-1-piperazinylcarbonylmethyl)-5-trifluoromethyl-2(3H)-benzothiazolinone (M.P. 170° to 172°C), etc.

Example 8

To a mixture of 3-[4-(2-hydroxyethyl)-1-piperazinylcarbonylmethyl]-5-chloro-2(3H)-benzothiazolinone (1.42 g), potassium carbonate (1.4 g) and chloroform (40 ml), there is dropwise added a mixture of acetyl chloride (0.8 g) and tetrahydrofuran (5 ml) while cooling in about 30 minutes. The resultant mixture is stirred at room temperature for 6 hours. The reaction mixture is washed with water, dried and concentrated to give 3-[4-(2-acetyloxyethyl)-1-piperazinylcarbonylmethyl]-5-chloro-2(3H)-benzothiazolinone as colorless oil. The oil is treated with maleic acid, and the resulting maleate is crystallized from ethanol to give colorless scales. M.P. 199.5° to 200°C.

Other examples of the compounds which can be prepared in the similar manner include: 3-[4-(2-isobutyryloxypropyl)-1-piperazinylcarbonylmethyl]-5-chloro-2(3H)-benzothiazolinone (M.P. 123° to 125°C), 3-[4-(2-isobutyryloxethyl)-1-piperazinylcarbonylmethyl]-5-chloro-2(3H)-benzothiazolinone (M.P. 111° to 113°C), 3-[4-(2-acetyloxypropyl)-1-piperazinylcarbonylmethyl]-5-chloro-2(3H)-benzothiazolinone (hydrochloride, M.P. 248° to 249°C), 3-[4-(2-isobutyryloxyethyl)-1-piperazinylcarbonylmethyl]-6-ethoxy-2(3H)-benzothiazolinone (M.P. 97° to 99°C), 3-[4-(2-palmitoyloxyethyl)-1-piperazinylcarbonylmethyl]-5-chloro-2(3H)-benzothiazolinone (M.P. 84° to 86°C), 3-[4-(2-palmitoyloxypropyl)-1-piperazinylcarbonylmethyl]-5-chloro-2(3H)-benzothiazolinone (M.P. 94° to 95°C), 3-[4-(2-phenylacetoxyethyl)-1-piperazinylcarbonylmethyl]-5-chloro-2(3H)-benzothiazolinone (hydrochloride, M.P. 206°–207°C), 3-[4-[2-(3, 4, 5 -trimethoxybenzoyloxy)ethyl]-1-piperazinylcarbonylmethyl]-5-chloro-2(3H)-benzothiazolinone [maleate, M.P. 123°–130°C-(decomp.)], 3-[4-(2-phenylacetoxypropyl)-1-piperazinylcarbonylmethyl]-5-chloro-2(3H)- benzothiazolinone [hydrochloride, M.P. 250°C(decoomp.)],
1-[4-(2-palmitoyloxyethyl)-1-piperazinylcarbonylmethyl]-3-methyl-6-chloro-2(3H)-benzimidazolinone (M.P. 97°–98°C),
3-[4-(2-stearoyloxyethyl)-1-piperazinylcarbonylmethyl]-5-trifluoromethyl-2(3H)-benzothiazolinone (M.P. 95°–96°C),
3-[4-(2-lauroyloxyethyl)-1-piperazinylcarbonylmethyl]-5-chloro-2(3H)-benzothiazolinone (maleate, M.P. 168°–171°C),
3-[4-(2-linoloyloxyethyl)-1-piperazinylcarbonylmethyl]-5-chloro-2(3H)-benzothiazolinone [maleate, M.P. 150°–152°C-(decomp.)],
3-[4-(2-stearoyloxyethyl)-1-piperazinylcarbonylmethyl]-5-chloro-2(3H)-benzothiazolinone (½H$_2$O, M.P. 74°–76°C),
3-[4-(2-lauroyloxypropyl)-1-piperazinylcarbonylmethyl]-5-chloro-2(3H)-benzothiazolinone (maleate, M.P. 162°–165°C),
3-[4-(2-linoloyloxypropyl)-1-piperazinylcarbonylmethyl]-5-chloro-2(3H)-benzothiazolinone [maleate, M.P. 147°–149°C( decomp.)],
3-[4-(2-palmitoyloxyethyl)-1-piperazinylcarbonylmethyl]-5-trifluoromethyl-2(3H)-benzothiazolinone (M.P. 98°–99°C), etc.

Example 9

To a solution of 3-(4-acetylmethyl-1-piperazinylcarbonylmethyl)-5-chloro- 2(3H)-benzothiazolinone (0.3 g) in methanol (15 ml), there is added portionwise sodium borohydride (0.3 g) at room temperature, and the resultant mixture is allowed to stand for 30 minutes. After removal of the methanol from the reaction mixture by distillation, the residue is admixed with water (20 ml), and the aqueous layer is extracted with ethyl acetate. The extract is dried and concentrated. Petroleum benzene is added to the residue so that oil is precipitated. The oil is collected by decantation, solidified and crystallized from a mixture of ethyl acetate and petroleum benzene to give 3-[4-(2-hydroxypropyl)-1-piperazinylcarbonylmethyl]-5-chloro-2(3)-benzothiazolinone (0.2 g) as colorless crystals. M.P. 104° to 105°C.

Other examples of the compounds which can be prepared in the similar manner include: 3-[4-(2-hydroxypropyl)-1-piperazinylcarbonylmethyl]-5-trifluoromethyl-2(3H)-benzothiazolinone (M.P. 152.5° to 154°C), 1-[4-(2-hydroxypropyl) -1-piperazinyl-3-methyl-6-chloro-2(3H)-benzimidazolinone (M.P. 202° to 206°C), etc.

Example 10

A. A mixture of ethyl 6-chloro-3-methyl-2-oxo-1-benzimidazolineacetate (0.5 g) and 2-(N,N-diethylamino)-ethylamine (2.5 g) is heated at 110°C for 20 hours. The reaction mixture is dissolved in chloroform (100 ml) and washed with water. The chloroform layer is extracted with 10 percent hydrochloric acid. The hydrochloric acid layer is washed with chloroform, made alkaline with 10 percent sodium hydroxide solution and extracted with chloroform. The chloroform extract is washed with water, dried over anhydrous magnesium sulfate and concentrated under reduced pressure. The residue is washed with petroleum benzin and crystallized from a mixture of benzene and petroleum benzin to give N-[2-(N,N-diethylamino)ethyl]-6-chloro-3-methyl-2-oxo-1-benzimidazolineacetamide (0.2 g) as white crystals. M.P. 124° to 126°C.

B. A mixture of ethyl 5-chloro-3-methyl-2-oxo 1-benzimidazolineacetate (0.3 g) and 1-(2-hydroxyethyl)-piperazine (1.0 ml) is heated at 110°C for 15 hours. The reaction mixture is combined with ethyl acetate, washed with water and extracted with 10 percent hydrochloric acid. The hydrochloric acid extract is washed with chloroform and made alkaline with 10 percent sodium hydroxide solution while cooling with ice. The alkaline solution is extracted with chloroform. The chloroform extract is dried over magnesium sulfate and concentrated under reduced pressure. The residue is crystallized from petroleum benzin and recrystallized from ethyl acetate to give 1-[4-(2-hydroxyethyl)-1-piperazinylcarbonylmethyl]-5-chloro-3-methyl-2-oxobenzimidazoline (0.3 g) as colorless needles. M.P. 173° to 174°C.

Other examples of the compounds which can be prepared in the similar manner include: 1-[4-(2-hydroxyethyl)-1- piperazinylcarbonylmethyl]-3-methyl-6-chloro-2(3H)-benzimidazolinone (M.P. 172° to 174°C) and 1-[4-(2-hydroxypropyl)-1-zinylcarbonylmethyl]-3-methyl-6-chloro-2(3H)-benzimidazolinone (M.P. 202° to 206°C).

Example A

A suitable formulation of tablets consists of:

| | Grams |
|---|---|
| (1) N-[2-(N,N-Diethylamino)ethyl]-2-oxo-3-benzothiazolineacetamide | 12.5 |
| (2) Lactose | 80 |
| (3) Starch | 5 |
| (4) Magnesium stearate | 2 |

The active ingredient, lactose and starch are thoroughly mixed and granulated. For tableting, the magnesium stearate is added, mixed with the granules, and the mixture tableted on a rotary press. Use of this procedure produces 100 tablets each containing 125 mg of the active ingredient.

Example B

Another suitable formulation of tablets consists of:

| | Grams |
|---|---|
| (1) N-[2-(N,N-Diethylamino)ethyl]-2-oxo-3-benzothiazolineacetamide | 5 175 |
| (2) Mannitol | 14 |
| (3) Starch | 5 |
| (4) Magnesium stearate | 1 |

The active ingredient, mannitol, starch and magnesium stearate are thoroughly mixed and granulated. For tableting, the magnesium stearate is added, mixed with granules, and the mixture tableted on a rotary press. Use of this procedure produces 100 tablets each containing 50 mg of the active ingredient.

Example C

A suitable formulation of dragees consists of:

| | |
|---|---|
| (1) 1-[4-(2-Hydroxyethyl)-1-piperazinyl-carbonylmethyl]-5-chloro-2(3H)-benzothiazolinone | 60,000 grams |
| (2) Aerosil | 4,500 grams |
| (3) Maize starch | 4,500 grams |
| (4) Stearic acid | 700 grams |
| (5) Ethanol | 6.0 liters |
| (6) Gelatin | 1,800 grams |
| (7) Purified water | 20.0 liters |
| (8) Talc | 600 grams |
| (9) Magnesium stearate | 375 grams |

From the above materials, there are prepared 600,000 cores each containing 100 mg of the active ingredient in a conventional manner.

Example D

A suitable formulation of suppositories consists of:

| | Grams |
|---|---|
| (1) 1-[4-(2-Hydroxyethyl)-1-piperazinyl-carbonylmethyl]-5-chloro-2(3H)-benzo-thiazolinone | 25,000 |
| (2) Ethylenediaminetetraacetic acid disodium salt dihydrate | 900 |
| (3) Witepsol H 12 | 124,100 |

From the above materials, there are prepared 100,00 supporitories each containing 250 mg of the active ingredient in a conventional manner.

We claim:

1. A compound of the formula:

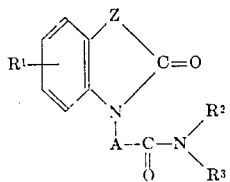

wherein
Z is sulfur or alkylimino of one to six carbon atoms;
A is alkylene of one to six carbon atoms;
R¹ is hydrogen, halogeno, alkoxy of one to six carbon atoms or trifluoromethyl; and
R² and R³, together with the nitrogen atom to which they are attached are 4homopiperazinyl in which alkyl has from one to six carbon atoms or a piperazinyl group of the formula:

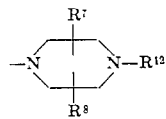

in which
each of R⁷ and R⁸, independent of the other, is hydrogen or methyl, and
R¹² is hydrogen, allyl,, propynyl, phenyl, benzoyl, alkyl of one to six carbon atoms, or alkyl of one to six carbon atoms monosubstituted by hydroxy, alkanoyl of two to seven carbon atoms, alkanoyloxy of two to seven carbon atoms, alkanoyloxy of eight to 20 carbon atoms, linolyloxy, carb alkoxy in which alkoxy has from one to six carbon atoms, phenyl, in which alkanoyloxy has from two to seven carbon atoms, tris-benzoyloxy in which alkoxy has from one to six carbon atoms, phenyl or di-(alkoxy) phenyl in which alkoxy has from one to six carbon atoms.

2. A compound according to claim 1 wherein Z is sulfur and R² and R³, together with the nitrogen atom to which they are attached, are a piperazino group of the formula:

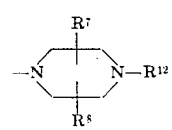

in which
R⁷, R⁸ and R¹² are as therein defined.

3. A compound according to claim 2 wherein R⁷ and R⁸ are hydrogen and R¹² is of one to six carbon atoms substituted by hydroxy.

4. The compound according to claim 3 which is 3[4-(2-hydroxyethyl)-1-piperazinylcarbonylmethyl]-5-chloro-2(3H)- benzothiazolinone.

5. The compound according to claim 3 which is 3-[4-(2-hydroxyethyl)-1-piperazinylcarbonylmethyl]-4-chloro-2(3H)- benzothiazolinone.

6. The compound according to claim 3 which is 3-[4-(2-hydroxyethyl)-1-piperazinylcarbonylmethyl]-6-chloro-2(3H)- benzothiazolinone.

7. The compound according to claim 3 which is 3-[4-(2-hydroxyethyl)-1-piperazinylcarbonylmethyl]-7-chloro-2(3H)- benzothiazolinone.

8. The compound according to claim 3 which is 3-[4-(2-hydroxyethyl)-1-piperazinylcarbonylmethyl]-2(3H)-benzothiazolinone.

9. The compound according to claim 3 which is 3-[4-(2-hydroxyethyl)-1-piperazinylcarbonylmethyl]-5-trifluoromethyl-2(3H)-benzothiazolinone.

10. The compound according to claim 3 which is 3-[4-(2-hydroxyethyl)-1-piperazinylcarbonylmethyl]-6-ethoxy- 2(3H)-benzothiazolinone.

11. The compound according to claim 3 which is 3-[4-(2-hydroxypropyl)-1-piperazinylcarbonylmethyl]-5-chloro- 2(3H)-benzothiazolinone.

12. The compound according to claim 3 which is 3-[4-(3-hydroxypropyl)-1-piperazinylcarbonylmethyl]-5-chloro- 2(3H)-benzothiazolinone.

13. The compound according to claim 3 which is 3-{1-[4-(2-hydroxypropyl)-1-piperazinylcarbonyl]ethyl} 5-chloro- 2(3H)-benzothiazolinone.

14. The compound according to claim 2 which is 3-[2,5-dimethyl-4-(2-hydroxyethyl)-1-piperazinylcarbonylmethyl]- 5-chloro-2(3H)-benzothiazolinone.

15. A compound according to claim 2 wherein R⁷ and R⁸ are hydrogen and R¹² is alkyl of one to six carbon atoms substituted by alkanoyloxy of from two to seven carbon atoms or substituted by alkanoyloxy of eight to 20 carbon atoms.

16. The compound according to claim 15 which is 3-[4-(2-acetoxyethyl)-1-piperazinylcarbonylmethyl]-5-chloro- 2(3H)-benzothiazolinone.

17. The compound according to claim 15 which is 3-[4-(2-acetoxypropyl)-1-piperazinylcarbonylmethyl]-5-chloro- 2(3H)-benzothiazolinone.

18. The compound according to claim 15 which is 3-[4-(2-isobutyryloxyethyl)-1-piperazinylcarbonylmethyl]-5- chloro-2(3H)-benzothiazolinone.

19. The compound according to claim 15 which is 3-[4-(2-isobutyryloxypropyl)-1-piperazinylcarbonylmethyl]-5- chloro-2(3H)-benzothiazolinone.

20. The compound according to claim 15 which is 3-[4-(2-isobutyryloxyethyl)-1-piperazinylcarbonylmethyl]-5- ethoxy-2(3H)-benzothiazolinone.

21. The compound according to claim 15 which is 3-[4-(2-palmitoyloxyethyl)-1-piperazinylcarbonylmethyl]-5-chloro- 2(3H)-benzothiazolinone.

22. The compound according to claim 15 which is 3-[4-(2-palmitoyloxypropyl)-1-piperazinylcarbonylmethyl]-5- chloro-2(3H)-benzothiazolinone.

23. The compound according to claim 15 which is 3-[4-(2-lauroyloxyethyl)-1-piperazinylcarbonylmethyl]-5-chloro- 2(3H)-benzothiazolinone.

24. The compound according to claim 15 which is 3-[4-(2-lauroyloxypropyl)-1-piperazinylcarbonylmethyl]-5-chloro- 2(3H)-benzothiazolinone.

25. The compound according to claim 15 which is 3-[4-(2-stearoyloxyethyl)-1-piperazinylcarbonylmethyl]-5-chloro- 2(3H)-benzothiazolinone.

26. The compound according to claim 15 which is 3-[4-(2-palmitoyloxyethyl)-1-piperazinylcarbonylmethyl]-5-trifluoromethyl-2(3H)-benzothiazolinone.

27. The compound according to claim 15 which is 3-[4-(2-stearoyloxyethyl)-1-piperazinylcarbonylmethyl]-5-trifluoromethyl -2(3H)-benzothiazolinone.

28. A compound according to claim 2 wherein $R^7$ and $R^8$ are hydrogen or methyl and $R^{12}$ is alkyl of one to six carbon atoms.

29. The compound according to claim 28 which is 3-(4-methyl-1-piperazinylcarbonylmethyl)-5-chloro-2(3H)-benzothiazolinone.

30. The compound according to claim 28 which is 3-(4-methyl-1-piperazinylcarbonylmethyl)-5-trifluoromethyl-2(3H)-benzothiazolinone.

31. The compound according to claim 28 which is 3-(2,4,5-trimethyl-1-piperazinylcarbonylmethyl)-5-chloro-2(3H)-benzothiazolinone.

32. A compound according to claim 2 wherein $R^7$ and $R^8$ are hydrogen and $R^{12}$ is alkyl of one to six atoms substituted by alkanoyl of two to seven carbon atoms.

33. The compound according to claim 32 which is 3-(4-acetylmethyl-1-piperazinylcarbonylmethyl)-5-chloro-2(3H)-benzothiazolinone.

34. The compound according to claim 32 which is 3-(4-acetylmethyl-1-piperazinylcarbonylmethyl)-5-trifluoromethyl- 2(3H)-benzothiazolinone.

35. A compound according to claim 2 wherein $R^7$, $R^8$ and $R^{12}$ are hydrogen.

36. A compound according to claim 2 wherein $R^7$ and $R^8$ are hydrogen and $R^{12}$ is alkyl of one to six carbon atoms substituted by linoloyloxy.

37. A compound according to claim 2 wherein $R^7$ and $R^8$ are hydrogen and $R^{12}$ is alkyl of one to six carbon atoms substituted by carbalkoxy in which alkoxy has from one to six carbon atoms.

38. A compound according to claim 2 wherein $R^7$ and $R^8$ are hydrogen and $R^{12}$ is alkyl of one to six carbon atoms substituted by phenylalkanoyloxy in which alkanoyloxy has from one to six carbon atoms.

39. A compound according to claim 2 wherein $R^7$ and $R^8$ are hydrogen and $R^{12}$ is alkyl of one to six carbon atoms substituted by tris (alkoxy)benzoyloxy in which each alkoxy has from one to six carbon atoms.

40. A compound according to claim 2 wherein $R^7$ and $R^8$ are hydrogen and $R^{12}$ is alkyl of one to six carbon atoms substituted by phenyl.

41. A compound according to claim 2 wherein $R^7$ and $R^8$ are hydrogen and $R^{12}$ is alkyl of one to six carbon atoms substituted by di (alkoxy) phenyl in which each alkoxy has from one to six carbon atoms.

42. A compound according to claim 2 wherein $R^7$ and $R^8$ are hydrogen and $R^{12}$ is phenyl.

43. A compound according to claim 2 wherein $R^7$ and $R^8$ are hydrogen and $R^{12}$ is benzoyl.

44. A compound according to claim 1 wherein Z is alkylimino of one to six carbon atoms, $R^1$ is halogen, $R^7$ and $R^8$ are hydrogen and $R^{12}$ is hydroxy alkyl of one to six carbon atoms or alkanoyloxy alkyl wherein alkanoyloxy has from two to 20 carbon atoms and alkyl has one to six carbon atoms.

45. The compound according to claim 44 which is 1-[4-(2-hydroxyethyl)-1-piperazinylcarbonylmethyl]-3-methyl-methyl-5- chloro-2(3H)-benzimidazolinone.

46. The compound according to claim 44 which is 1-[4-(2-hydroxyethyl)-1-piperazinylcarbonylmethyl]-3-methyl-6- chloro-2(3H)-benzimidazolinone.

47. The compound according to claim 44 which is 1-[4-(2-hydroxypropyl)-1-piperazinylcarbonylmethyl]-3-methyl- 6-chloro-2(3H)-benzimidazolinone.

48. The compound according to claim 44 which is 1-[4-(2-palmitoyloxyethyl)-1-piperazinylcarbonylmethyl]-3-methyl-6-chloro-2(3H)-benzimidazolinone.

* * * * *